(12) United States Patent
Wang et al.

(10) Patent No.: US 12,048,050 B2
(45) Date of Patent: Jul. 23, 2024

(54) COMBINED NETWORK ACCESS INTERFACE AND SIDELINK INTERFACE DISCONTINUOUS RECEPTION (DRX) ALIGNMENT

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US); Sony Akkarakaran, Poway, CA (US); Junyi Li, Fairless Hills, PA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/497,717

(22) Filed: Oct. 8, 2021

(65) Prior Publication Data

US 2023/0117475 A1    Apr. 20, 2023

(51) Int. Cl.
*H04W 76/28* (2018.01)
*H04W 56/00* (2009.01)

(52) U.S. Cl.
CPC ....... *H04W 76/28* (2018.02); *H04W 56/0005* (2013.01)

(58) Field of Classification Search
CPC ............. H04W 76/28; H04W 52/0216; H04W 52/0225; H04W 76/14; H04W 92/10; H04W 92/18; H04W 56/0005
See application file for complete search history.

(56) References Cited

U.S. PATENT DOCUMENTS

| | | | |
|---|---|---|---|
| 2021/0227621 A1* | 7/2021 | Pan | H04W 72/02 |
| 2021/0345133 A1* | 11/2021 | Li | H04W 24/02 |
| 2022/0232665 A1* | 7/2022 | Back | H04W 76/28 |
| 2022/0418036 A1* | 12/2022 | Back | H04W 52/0216 |
| 2023/0014303 A1* | 1/2023 | Di Girolamo | H04W 72/20 |

(Continued)

OTHER PUBLICATIONS

3GPP TSG-RAN WG2 Meeting #115 electronic; R2-2107433; Title: Further consideration on SL DRX configuration; Source: ZTE Corporation, Sanechips; Online, Aug. 16-27, 2021. (Year: 2021).*

(Continued)

*Primary Examiner* — Mohammed S Chowdhury
(74) *Attorney, Agent, or Firm* — Loza & Loza, LLP

(57) ABSTRACT

A network access node including a transceiver coupled to a sidelink receiver user equipment (UE) (or to a sidelink transmitter UE) is disclosed. The network access node may obtain a network access interface discontinuous reception (DRX) slot offset value (or a sidelink interface DRX slot offset value) corresponding to a shift in a network access interface DRX Active state start time (or a sidelink interface DRX Active state start time) of the receiver UE. The shift may configure an alignment of a sidelink interface DRX Active state start time (or the network access interface DRX Active state start time) with the network access interface DRX Active state start time (or the sidelink interface DRX Active state start time). The network access interface DRX (or sidelink interface DRX) slot offset value may be transmitted to the receiver UE.

25 Claims, 15 Drawing Sheets

(56) References Cited

U.S. PATENT DOCUMENTS

| | | | |
|---|---|---|---|
| 2023/0097552 A1* | 3/2023 | Freda .................. | H04L 1/1848 |
| | | | 370/329 |
| 2023/0345370 A1* | 10/2023 | Ma ....................... | H04W 76/28 |
| 2023/0380000 A1* | 11/2023 | Lee ...................... | H04W 76/28 |

OTHER PUBLICATIONS

3GPP TSG-RAN WG2 Meeting #113 bis electronic; R2-2103577; Source: MediaTek Inc.; Title: on coordination between Uu DRX and SL DRX ; Online, Apr. 12-Apr. 20, 2021. (Year: 2021).*

3GPP TSG-RAN WG2 Meeting #114-e; R2-2105083; Source: Huawei, HiSilicon ; Title: Consideration on the sidelink DRX for unicast; Online, May 19-May 27, 2021 (Year: 2021).*

3GPP TSG RAN WG2 Meeting #115-e ; R2-2107312; Source: Intel Corporation; Title: on DRX wake-up time alignment; Electronic meeting, Online, Aug. 2021. (Year: 2021).*

* cited by examiner

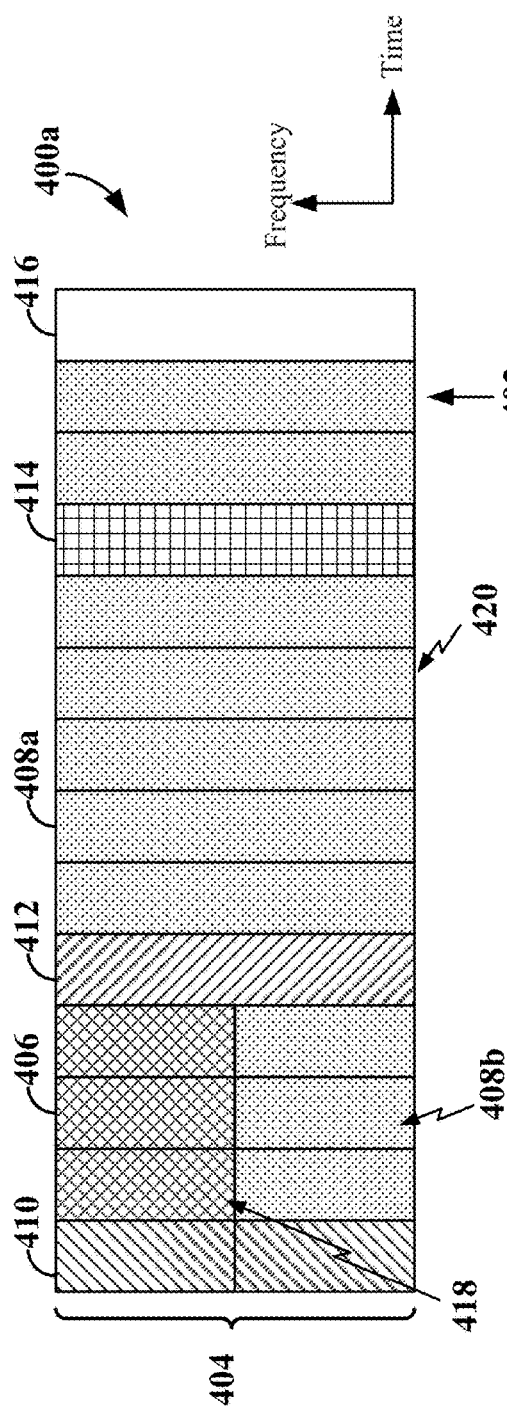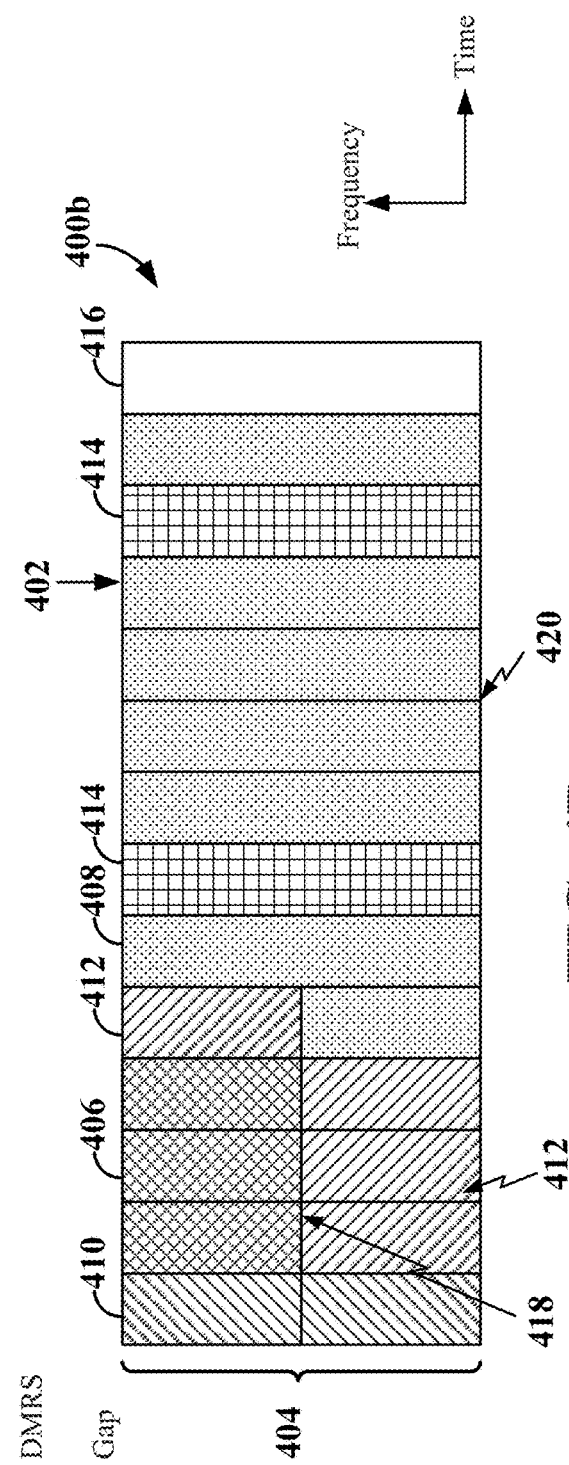
FIG. 4A
FIG. 4B

COMBINED NETWORK ACCESS INTERFACE AND SIDELINK INTERFACE DISCONTINUOUS RECEPTION (DRX) ALIGNMENT

TECHNICAL FIELD

The technology discussed below relates generally to wireless communication networks, and more particularly, to techniques for combined network access interface (e.g., a Uu interface) and sidelink interface (e.g., a PC5 interface) discontinuous reception (DRX) alignment.

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) or sidelink interface (also referred to as a PC5 interface or the PC5). In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

A wireless communication device may enter a "sleep" state for a given duration to conserve power in connection with communications utilizing both the network access interface (also referred to as the Uu interface or the Uu) and the sidelink interface. The wireless communication device may not monitor the PDCCH for uplink and/or downlink traffic during the sleep state. However, the wireless communication device may periodically wake up and enter an active state, during which the wireless communication device may monitor the PDCCH for uplink and/or downlink traffic. The cycling between sleep and active states may be referred to as discontinuous reception (DRX). A network access node may configure a wireless communication device with DRX configuration parameters.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a first network access node in a wireless communication network is disclosed. The first network access node includes a transceiver communicatively coupled with a sidelink receiver user equipment (UE) on a first network access interface, where the receiver UE can include a sidelink interface. The first network access node also includes a memory and a processor communicatively coupled to the transceiver and the memory. In the example, the processor and the memory can be configured to: obtain a network access interface discontinuous reception (DRX) slot offset value corresponding to a shift in a network access interface DRX Active state start time of the receiver UE that configures an alignment of a sidelink interface DRX Active state start time and the network access interface DRX Active state start time of the receiver UE, and transmit the network access interface DRX slot offset value to the receiver UE.

In another example, a first network access node in a wireless communication network is disclosed. The first network access node includes a transceiver communicatively coupled with a sidelink transmitter user equipment (UE) on a first network access interface, where the transmitter UE includes a sidelink interface. The first network access node also includes a memory and a processor communicatively coupled to the transceiver and the memory. In the example, the processor and the memory can be configured to: obtain a sidelink interface discontinuous reception (DRX) slot offset value corresponding to a shift in a sidelink interface DRX Active state start time of the receiver UE that configures an alignment of the sidelink interface DRX Active state start time and a network access interface DRX Active state start time of the receiver UE, and transmit the sidelink interface DRX slot offset value to the receiver UE.

In still another example, a sidelink user equipment (UE), configured as a sidelink receiver UE, in a wireless communication network is disclosed. The receiver UE includes a transceiver configured to communicatively couple with a first network access node on a first network access interface and a sidelink transmitter UE on a sidelink interface. The receiver UE also includes a memory and a processor communicatively coupled to the transceiver and the memory. In the example the processor and the memory can be configured to: receive a network access interface discontinuous reception (DRX) slot offset value, update a network access interface DRX configuration of the receiver UE with the network access interface DRX slot offset value, and shift a network access interface DRX Active state start time to align a sidelink interface DRX Active state start time and the network access interface DRX Active state start time based on the update to the network access interface DRX configuration.

These and other aspects will become more fully understood upon a review of the detailed description, which follows. Other aspects, features, and examples will become apparent to those of ordinary skill in the art, upon reviewing the following description of specific, exemplary examples of in combination with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIGS. 4A and 4B are diagrams illustrating examples of sidelink slot structures according to some aspects.

DETAILED DESCRIPTION

Figure 1:
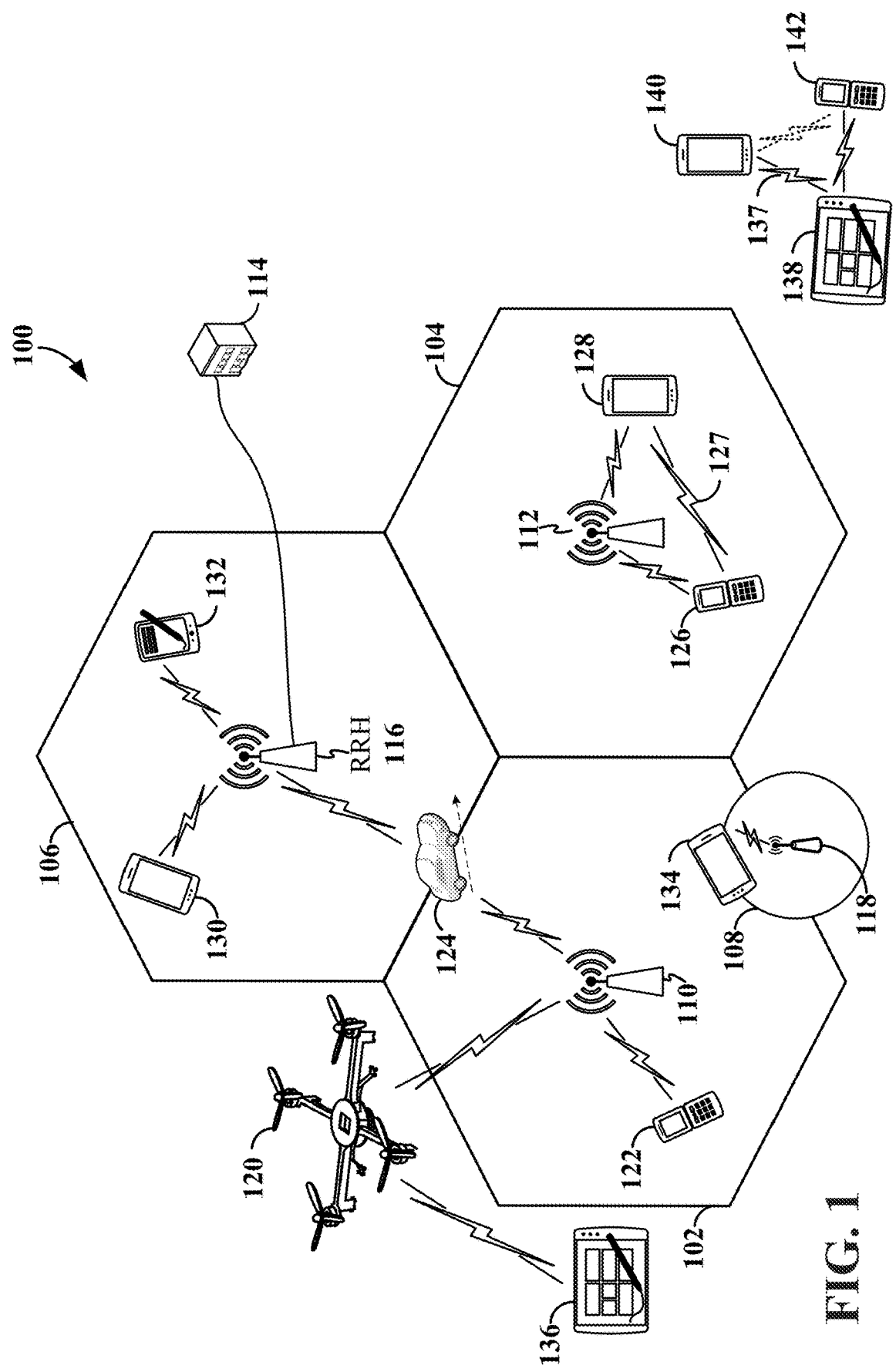
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

To conserve power in connection with communications utilizing both of the network access interface and sidelink interface, a wireless communication device may enter a "Sleep" state for a given duration, during which the wireless communication device does not monitor the physical downlink control channel (PDCCH) for uplink or downlink traffic. The wireless communication device may periodically wake up and enter an "On" state, also referred to as an "Active" state during which the PDCCH is monitored. The wireless communication device may cycle between Sleep and Active states in relation to the network access interface according to a network access interface DRX cycle. The wireless communication device may cycle between Sleep and Active states in relation to the sidelink interface according to a sidelink interface cycle (also referred to as a sidelink interface DRX cycle or a SL DRX cycle herein).

Various aspects of the disclosure relate to techniques for aligning DRX cycles of a wireless communication device operating in a combined network configured to have both a network access interface and a sidelink interface. When configured for communication on both the network access interface and sidelink interface, inefficiencies in power savings may occur if the network access interface DRX cycle is not aligned with the sidelink interface DRX cycle. The network access interface DRX cycle and the sidelink interface DRX cycle may be aligned so that the Active and Sleep states (the On and Off states, or at least some of the On and Off states) of the network access interface DRX cycle and the sidelink interface DRX cycle coincide. This alignment may improve power savings efficiency.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 110 is provided. The RAN 110 may implement any suitable wireless communication technology or technologies to provide radio access. As one example, the RAN 110 may operate according to $3^{rd}$ Generation Partnership Project (3GPP) New Radio (NR) specifications, often referred to as 5G. As another example, the RAN 110 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 110 may be divided into a number of cellular regions (cells) that can be uniquely identified by a user equipment (UE) based on an identification broadcasted over a geographical area from one access point or base station. FIG. 1 illustrates cells 112, 114, 116, and cell 118, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station (e.g., a network access node) is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 110 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 112 and 114; and a third base station 114 is shown controlling a remote radio head (RRH) 116 in cell 116. That is, a base station can have an integrated antenna or can be connected to an antenna or RRH by feeder cables. In the illustrated example, the cells 112, 114, and 116 may be referred to as macrocells, as the base stations 110, 112, and 114 support cells having a large size. Further, a base station 118 is shown in the cell 118 which may overlap with one or more macrocells. In this example, the cell 118 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 110 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 110 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 110, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 112 by communicating with base station 110.

Wireless communication between a RAN 110 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 11 ms) for wireless transmissions, with each frame consisting of, for example, 11 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a sidelink receiver device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on the Institute of Electrical and Electronics Engineers (IEEE) 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 110, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication.

The SCMF can manage, in whole or in part, the security context for both the control plane and the user plane functionality.

In some examples, a RAN 110 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 112 to the geographic area corresponding to a neighbor cell 116. When the signal strength or quality from the neighbor cell 116 exceeds that of its serving cell 112 for a given amount of time, the UE 124 may transmit a reporting message to its serving base station 110 indicating this condition. In response, the UE 124 may receive a handover command, and the UE may undergo a handover to the cell 116.

In various implementations, the air interface in the RAN 110 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 110 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 110 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
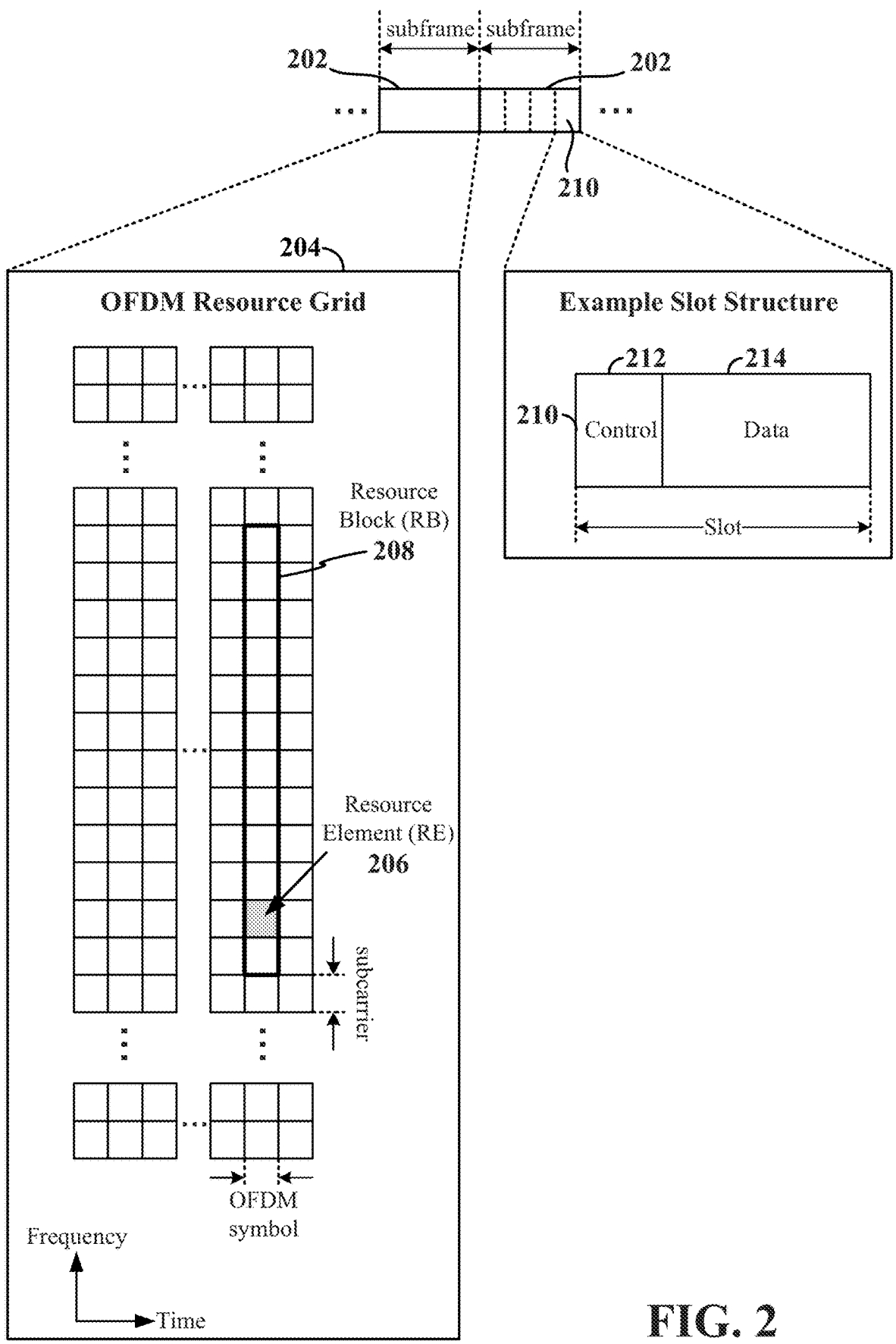
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time—frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional example may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a network access interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 11, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a sidelink interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other sidelink receiver devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the sidelink receiver device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
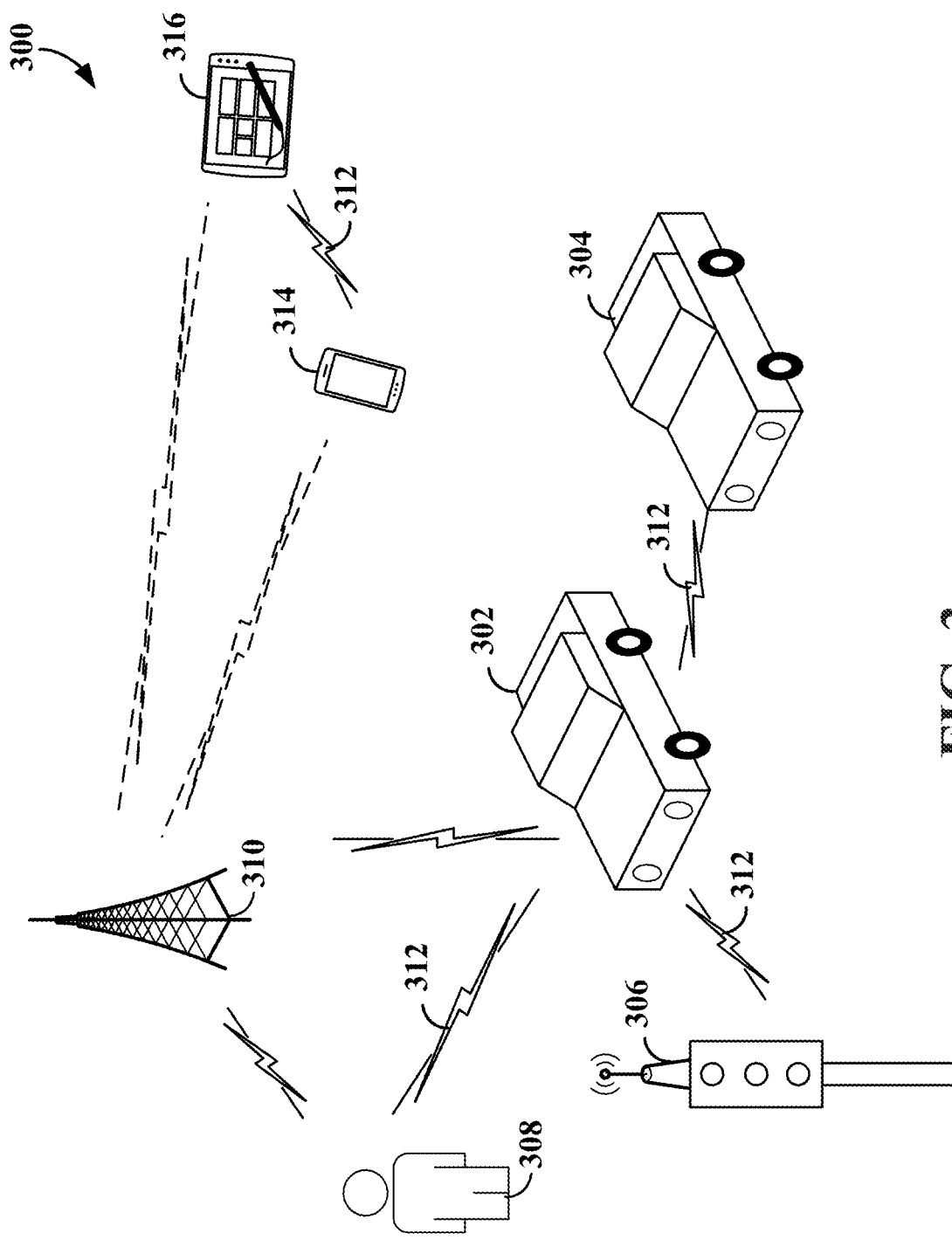
FIG. 3 is a diagram illustrating an example of a wireless communication network employing sidelink communication according to some aspects.

FIG. 3 is a diagram illustrating an example of a wireless communication network 300 employing sidelink communication according to some aspects. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside unit (RSU) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving, and improve road safety, and improve traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface (e.g., a sidelink interface). In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a network access interface (e.g., a Uu interface, network interface, cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 11, 15, 20, 25, 50, 75, or 110 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK (e.g., for groupcast option 1 supporting NACK-only signaling). SCI-2 may include other information that is useful for establishing and decoding a PSSCH resource.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 11, 14, 20, 24, 40, 44, or 110 PRBs).

FIGS. 4A and 4B are diagrams illustrating examples of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 that schedules transmission of data traffic on time—frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSSCH resource size may be fixed for a resource pool (e.g., 11% to 110% of one sub-channel in the first two or three symbols). For example, the PSCCH 406 may occupy 11, 12, 15, 20, or 25 RBs of a single sub-channel. A DMRS may further be present in every PSCCH symbol. In some examples, the DMRS may be placed on every fourth RE of the PSCCH 406. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 4A and 4B, the starting symbol for the PSCCH 406 is the second symbol of the corresponding slot 400*a* or 400*b* and the PSCCH 406 spans three symbols 402.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408*a* that is TDMed with the PSCCH 406 and a second portion 408*b* that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., quadrature phase shift key (QPSK), 16-quadrature amplitude modulation (QAM), 64-QAM and 256-QAM). In addition, the PSSCH 408 may include DMRSs 414 configured in a two, three, or four symbol DMRS pattern. For example, slot 400*a* shown in FIG. 4A illustrates a two symbol DMRS pattern, while slot 400*b* shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400*a* or 400*b*. In addition, a gap symbol 416 is present after the PSSCH 408 in each slot 400*a* and 400*b*.

Each slot 400*a* and 400*b* further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (e.g., the receiver UE).

In each of FIGS. 4A and 4B, the second symbol of each slot 400*a* and 400*b* is copied onto (repeated on) a first symbol 410 thereof for automatic gain control (AGC) settling. For example, in FIG. 4A, the second symbol containing the PSCCH 406 FDMed with the PSSCH 408 may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
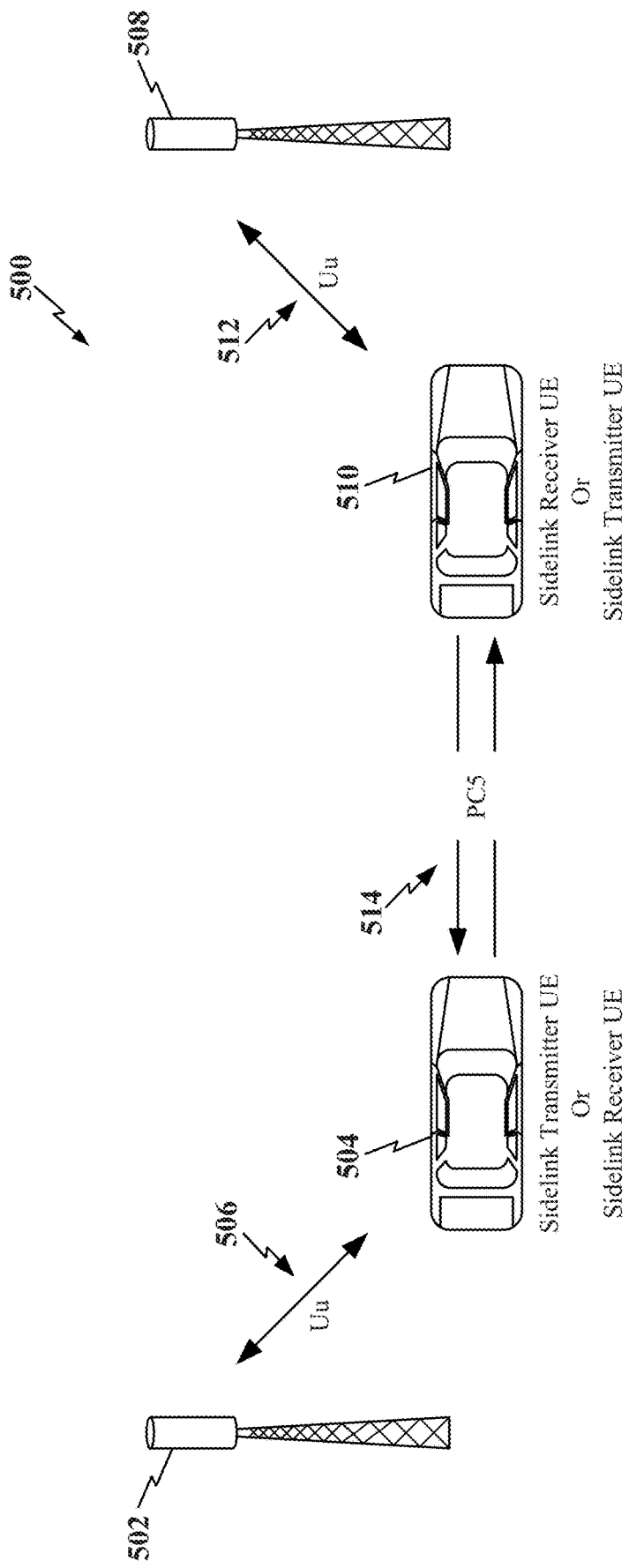
FIG. 5 is a schematic illustration of a wireless communication network for wireless communication according to some aspects.

FIG. 5 is a schematic illustration of a wireless communication network 500 for wireless communication according to some aspects. In the example of FIG. 5, the wireless communication network includes at least a first network access node 502 (e.g., base station, eNB, gNB), a second network access node 508 (e.g., base station, eNB, gNB), a first wireless communication device 504 (e.g., a UE, a wireless communication device equipped vehicle, a UE within the vehicle, a UE carried by a pedestrian while walking or riding a bicycle, etc.), and a second wireless communication device 510 (e.g., a UE, a wireless communication device equipped vehicle, a UE within the vehicle, a UE carried by a pedestrian while walking or riding a bicycle, etc.). The first network access node 502 may communicate with the first wireless communication device 504 via a first network access interface 506 (e.g., a Uu interface). The first network access node 502 may schedule resources for use by the first wireless communication device 504. The first network access node 502 may schedule network communications between the first wireless communication device 504, the second wireless communication device 510, other wireless communication devices (not shown), and/or remote servers (not shown) via the first network access interface 506.

Also, in the example of FIG. 5, the second network access node 508 may communicate with the second wireless communication device 510 via a second network access interface 512. The second network access node 508 may schedule resources for use by the second wireless communication device 510. The second network access node 508 may schedule network communications between the second wireless communication device 510, the first wireless communication device 504, other wireless communication devices (not shown), and/or remote servers (not shown) via the second network access interface 512.

FIG. 5 also depicts wireless communications between the first wireless communication device 504 and the second wireless communication device 510. The wireless communications may be provided via a sidelink PC5 interface 514 (also referred to herein as a sidelink interface). As depicted in FIG. 5, the PC5 interface 514 may be a half-duplex interface where simultaneous transmission and reception between end points may not occur. In half-duplex communications, a UE receives while another UE transmits. Accordingly, at a first time the first wireless communication device 504 may be a sidelink transmitter user equipment (SL Tx UE or Tx UE as referred to herein), while the second wireless communication device 510 may be a sidelink receiver user equipment (SL Rx UE or Rx UE as referred to herein). At a second time, the first wireless communication device 504 may be a sidelink Rx UE while the second wireless communication device 510 may be a sidelink Tx UE.

Sidelink communications may be divided into two modes. In Mode 1, a network access node schedules the sidelink communications between a transmitting wireless communication device (e.g., a Tx UE) and a receiving wireless communication device (e.g., an Rx UE). In Mode 2, sidelink UEs (e.g., the first wireless communication device 504 and the second wireless communication device 510) may schedule their own resources without the aid of a network access node. A pair of wireless communication devices utilizing Mode 2 sidelink communications may be in proximity to each other (e.g., such as a lead car being followed by a chase car, where the two cars are within a few car lengths of each other, or a car near a pedestrian waiting to cross a road at a cross-walk). Sidelink communications may be configured to operate in a licensed or unlicensed spectrum. Thus any sidelink UE may access a common frequency and share information. Such harmonized/common spectrum operations may further safety and reliability.

As depicted in FIG. 5, network communications using the first network access interface 506 and the second network access interface 512 may exist simultaneously with sidelink communication using the PC5 interface 514. In FIG. 5, the communications between the first network access node 502 and the first wireless communication device 504 and the between the second network access node 508 and the second wireless communication device 510 are illustrated as being vehicle-to-network (V2N) type communications; however, the illustration is for exemplary and non-limiting purposes. For example, other types of communication, such as vehicle-to-person (V2P) or vehicle-to-infrastructure (V2I), are within the scope of the disclosure. As depicted in FIG. 5, the first network access interface 506 and the second network access interface 512 may be full-duplex interfaces where simultaneous transmission and reception between end points may occur. As stated above, the PC5 interface 514 may be a half-duplex interface, where a UE may transmit or receive but may not transmit and receive simultaneously.

To conserve power in connection with communications utilizing both of the network access interface and PC5 interfaces, wireless communication devices (such as, but not limited to the first wireless communication device 504, the second wireless communication device 510) may enter a "sleep" state (referred to herein as an "Off" state) for a given duration. The Off state may last for an "Off Duration." The wireless communication device may not monitor the PDCCH for uplink and/or downlink data during the Off Duration. However, the wireless communication device may periodically wake up and enter an "On" state, also referred to as an "Active" state. The On state may last for an "On Duration." During the On Duration, the wireless communication device may monitor the PDCCH for downlink/uplink data. The cycling between Active and Sleep states (between On and Off states) may be referred to as discontinuous reception (DRX). A network access node (e.g., the first network access node 502 and the second network access node 508) may configure a wireless communication device (e.g., the first wireless communication device 504 and the second wireless communication device 510) with DRX parameters. Configuration may be via RRC signaling, a medium access control-control element (MAC CE), or other conveyances, for example. As the name implies, discontinuous reception (DRX) applies to downlink network communications (e.g., via a Uu interface) or received sidelink communications (e.g., via a PC5 interface at a sidelink Rx UE). The uplink network communications and transmitted sidelink communications (e.g., from a sidelink Tx UE) may not be affected by DRX operation.

When configured for communication on both a network access interface and a sidelink interface, inefficiencies in power savings may occur if the network access interface DRX cycles are not aligned with the sidelink interface DRX cycles. For example, if they are not aligned, a network access interface DRX cycle may enter an Off state (and certain circuits utilized to monitor the PDCCH may be powered off) while at the same time a sidelink interface DRX cycle may be in or enter an On state (where those same circuits may be turned on to monitor the PDCCH). The network access interface DRX cycles and the sidelink interface DRX cycles may be aligned so that On states and Off states of the network access interface DRX cycle and the sidelink interface DRX cycle coincide, thereby leaving the circuits utilized to monitor the PDCCH in an Off state for a more extended period (when compared to the Off states of non-aligned DRX cycles). The alignment may improve power savings efficiency. Examples described herein may reduce power consumption and the use of processing resources due to the alignment of the network access interface DRX cycles and sidelink interface DRX cycles of a given wireless communication device.

Figure 6:
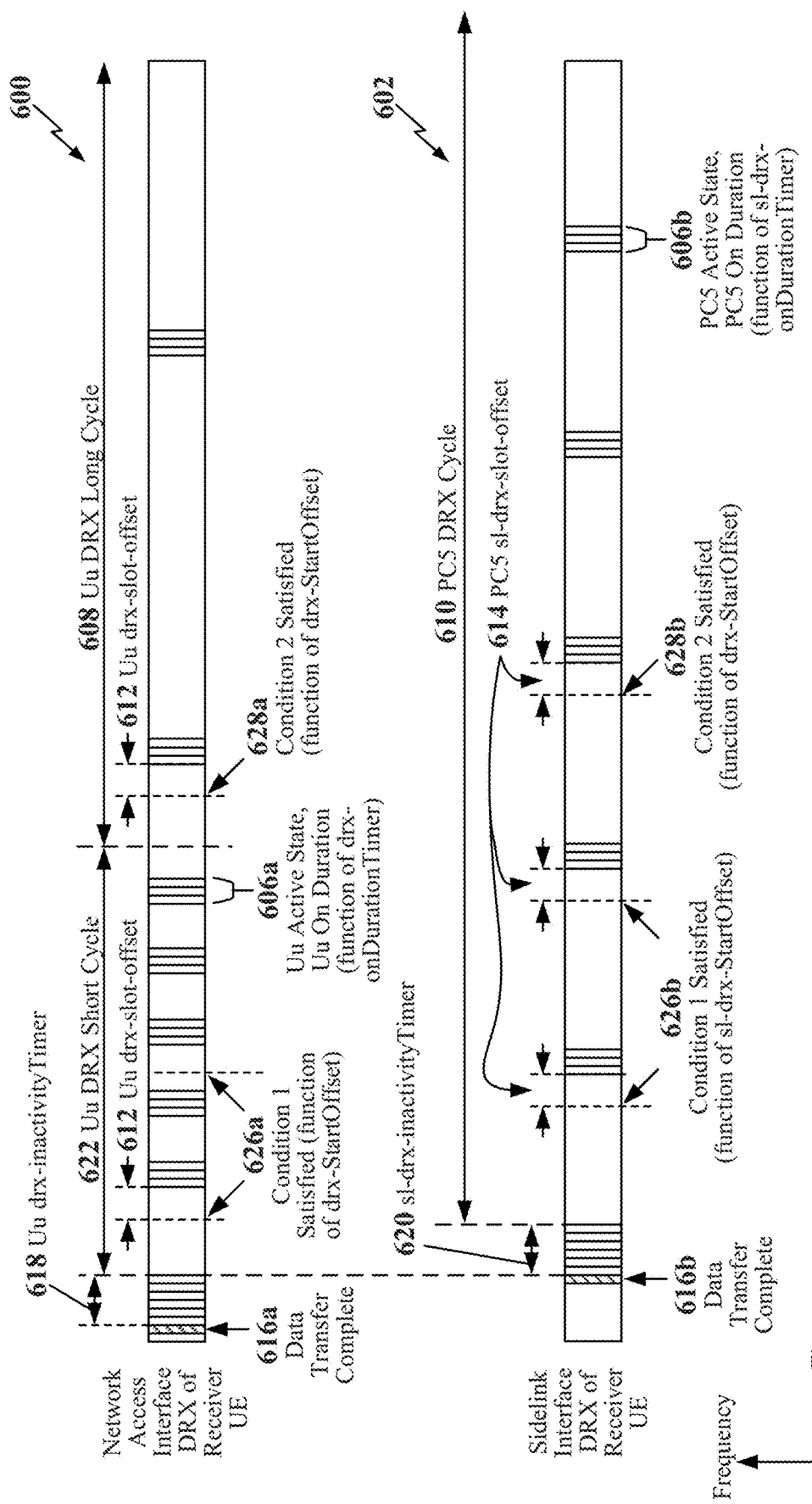
FIG. 6 is an illustration of frequency-time resources, comparing network access interface discontinuous reception (DRX) cycles and sidelink interface DRX cycles of a sidelink receiver user equipment according to some aspects.

FIG. 6 is an illustration of frequency-time resources, comparing network access interface (e.g., a Uu interface) discontinuous reception (DRX) cycles 600 and sidelink interface (e.g., PC5 interface) DRX cycles 602 of an Rx UE (e.g., either of the first wireless communication device 504 or the second wireless communication device 510 when configured as a sidelink Rx UE, as illustrated and described in connection with FIG. 5) according to some aspects. The DRX operation is a timer-based operation. In the example of FIG. 6, connected mode DRX operations are depicted. In FIG. 6, frequency is displayed along the vertical axis and time is displayed along the horizontal axis. The relative position between the network access interface DRX cycles 600 and the sidelink interface DRX cycles 602 along the vertical frequency axis (i.e., one at higher frequencies than the other) is for illustrative and non-limiting purposes.

During DRX, the Rx UE may conserve power by turning off various circuits that would otherwise be left on to receive or transmit packets. However, the Rx UE may occasionally wake up to listen to a PDCCH. As described above, the listening state may be referred to as an "Active" state (or a DRX "On" state). The duration of the Active state may be referred to as the "On Duration." The sleeping state during which the Rx UE does not listen to the PDCCH may be referred to as a "Sleep" state (or a DRX "Off" state). The duration of the Sleep state may be referred to as the "Off Duration." In FIG. 6, the durations of the network access interface DRX Active state 606a and the sidelink interface DRX Active state 606b have the same time scale to illustrate the non-aligned nature of the start of each network access interface DRX Active state 606a and the start of each sidelink interface DRX Active state 606b.

The duration of the network access interface DRX Active state 606a may be a function of a configurable discontinuous reception On Duration timer (e.g., drx-onDurationTimer) parameter, while the duration of the sidelink interface DRX Active state 606b may be a function of a configurable sidelink interface discontinuous reception On Duration timer (e.g., sl-drx-onDurationTimer) parameter. The values of the drx-onDurationTimer parameter and the sl-drx-onDurationTimer parameter may be the same or different. In FIG. 6, the network access interface DRX Sleep state (or network access interface DRX Off state) is represented by the spaces between adjacent network access interface DRX Active state 606a representations. The sidelink interface DRX Sleep state (or sidelink interface DRX Off state) is represented by the spaces between adjacent sidelink interface DRX Active state 606b representations. The network access interface DRX Sleep state and sidelink interface DRX Sleep state representations are not labeled in FIG. 6 to avoid cluttering the drawing.

For the network access interface, the network access interface DRX cycle may be a DRX short cycle or a DRX long cycle. When configured for DRX operation, the use of the DRX short cycle may be optional and therefore, such use may be explicitly configured. Each DRX long cycle includes one or more On Durations and one or more Off Durations. The On and Off Durations together form the DRX long cycle. The DRX long cycle may be configured by RRC signaling, for example. The sidelink interface DRX cycle does not have a long/short cycle; there is only one cycle, referred to herein as the sidelink interface DRX cycle 610.

The network access interface DRX long cycle 608 and the sidelink interface DRX cycle 610 may have the same or different durations.

A network access node may select resources to start a network access interface DRX long cycle 608 using, for example, the RRC DRX long cycle start offset (e.g., drx-LongCycleStartOffset) parameter (not shown). According to some aspects, the drx-LongCycleStartOffset parameter value may result in a network access interface DRX long cycle 608 that may start at a subframe boundary. Similarly, the network access node may select resources to start a sidelink interface DRX cycle 610 using, for example, the RRC sidelink interface DRX cycle start offset (e.g., sl-drx-CycleStartOffset) parameter (not shown). According to some aspects, the sl-drx-CycleStartOffset parameter value may result in a sidelink interface DRX cycle 610 that may start at a subframe boundary.

Additionally, the network access node may select resources to configure a start of the network access interface On Duration and the sidelink On Duration at slot level granularity within a subframe. The parameter network access interface DRX slot offset 612 (e.g., Uu drx-SlotOffset) may be used to define the start of the network access interface On Duration relative to the start of a subframe boundary. Similarly, the sidelink interface DRX slot offset 614 parameter (e.g., PC5 sl-drx-slot-Offset) may be used to define the start of the sidelink interface On Duration relative to the start of a subframe boundary.

The network access interface DRX short cycle may be triggered after the expiration of a network access interface DRX inactivity timer. The duration of the network access interface DRX inactivity timer may be defined with the network access interface DRX inactivity timer 618 (e.g., Uu drx-inactivityTimer) parameter. The network access interface DRX inactivity timer may start following the completion of a data transfer (e.g., data transfer complete 616a). The network access interface DRX long cycle may begin when the network access interface DRX short cycle ends. Once a network access interface DRX long cycle 608 starts, the Rx UE may stay active during the network access interface DRX Active state 606a, for a duration given by the DRX On Duration timer (drx-onDurationTimer) parameter. If no PDCCH is received during this duration, the Rx UE may return to a network access interface DRX sleep state, until the start of a next network access interface On Duration. Similarly, once a sidelink interface DRX cycle 610 starts, the Rx UE may stay active during the sidelink interface DRX Active state 606b for a duration given by the sidelink interface DRX On Duration timer (sl-drx-onDurationTimer) parameter. If no PDCCH is received during this duration, the Rx UE may return to a sidelink interface DRX sleep state, until the start of a next sidelink interface On Duration.

If Rx UE had PDCCH activity and was scheduled to transfer data during an On Duration (e.g., network access interface DRX Active state 606a, sidelink interface DRX Active state 606b), it may be possible that the Rx UE will be scheduled again following the completion of the data transfer. Accordingly, it may be beneficial to keep the Rx UE awake for a period following the data transfer completion (e.g., data transfer complete 616a, 616b). Accordingly, in the network access interface DRX cycle of the Rx UE, a network access interface DRX inactivity timer having a duration that is a function of a network access interface DRX inactivity timer 618 (e.g., a Uu drx-inactivityTimer) parameter may be configured by use of a MAC CE, for example. Similarly, in the sidelink interface DRX of the Rx UE, a sidelink interface DRX inactivity timer having a duration that is a function of a sidelink interface DRX inactivity timer 620 (e.g., PC5 sl-drx-inactivityTimer) parameter may be configured by use of a MAC CE, for example.

The Rx UE may start or restart the network access interface DRX inactivity timer (e.g., which is a function of the network access interface DRX inactivity timer 618 parameter (e.g., the Uu drx-inactivityTimer parameter) each time the PDCCH indicates a new network UL or DL transmission; the Rx UE may then stay in the network access interface DRX Active state 606a for the network access interface On Duration and may continue monitoring the PDCCH for a new network UL or DL transmission until the expiry of network access interface DRX inactivity timer. The Rx UE may similarly start or restart the sidelink interface DRX inactivity timer (e.g., which is a function of the sidelink interface DRX inactivity timer 620 (e.g., PC5 sl-drx-inactivityTimer) parameter); the Rx UE may then stay in the sidelink interface DRX Active state 606b for the sidelink interface On Duration, monitoring for new sidelink reception or transmission, until the expiry of sidelink interface DRX inactivity timer.

In certain instances, a data transmission may be followed by a long period of no activity. In certain cases, the durations of a DRX long cycle may not provide enough time to cover the long period. Accordingly, a network access node may configure a DRX long cycle with an additional DRX cycle that is shorter than the long cycle. This additional DRX cycle is referred to herein as a DRX short cycle.

When a network access node configures a DRX short cycle, both the network access interface DRX short cycle 622 and the network access interface DRX long cycle 608 may be implemented (one after another). Configuring a DRX short cycle may be optional and if not configured, the Rx UE may follow a DRX long cycle alone. According to some aspects, a duration of a DRX short cycle may be shorter than a duration of a DRX long cycle. In some aspects, a DRX long cycle duration may be an integer multiple of a DRX short cycle duration.

If the network access node configures a DRX short cycle, and if there was no data activity during an Active state (e.g., network access interface DRX Active state 606a, sidelink interface DRX Active state 606b) of a DRX long cycle, the Rx UE may follow the DRX long cycle as if the DRX short cycle was not configured. If there was data activity during the Active state of the DRX long cycle (e.g., as depicted by the data activity following the data transfer complete 616a indication of FIG. 6), the Rx UE may switch to the DRX short cycle and follow the DRX short cycle for certain amount of time. If there is no data activity during that certain amount of time, the Rx UE may switch back to the DRX long cycle. A short DRX configuration may include a DRX sort cycle (e.g., drx-ShortCycle) parameter (not shown) and a DRX short cycle timer (e.g., drx-ShortCycleTimer) parameter (not shown). The drx-ShortCycle parameter may define the DRX short cycle duration. The drx-ShortCycleTimer may be configured as an integer that defines a number of short cycles the Rx UE may enter after starting a DRX short cycle.

If there is no data activity during the period defined by drx-ShortCycleTimer x drx-ShortCycle, the Rx UE may enter a DRX long cycle. The Rx UE may enter the DRX long cycle upon reaching the drx-ShortCycleTimer number of DRX short cycles.

The start of an Active state (e.g., network access interface DRX Active state 606a and/or sidelink interface DRX Active state 606b) for a respective On Duration may be determined for the network access interface using the long cycle DRX start offset (e.g., drx-StartOffset) parameter and the DRX slot offset (drx-SlotOffset) parameter and determined for the sidelink interface using the sidelink interface DRX start offset (e.g., PC5 sl-drx-StartOffset) parameter and the sidelink interface DRX slot offset (e.g., PC5 sl-drx-SlotOffset) parameter.

The triggering conditions (timing) for a DRX cycle may be as follows:

If a DRX short cycle is configured, the Active state (e.g., On Duration) starts at a subframe satisfying the below calculated condition (referred to in FIG. 6 as "Condition 1" 626a, 626b). Within the calculated subframe, the On Duration may begin after a certain slot offset which may be determined for the network access interface by the drx-StartOffset parameter and for the sidelink interface by sl-drx-StartOffset parameter.

[(system frame number (SFN)×10)+subframe number]mod(drx-ShortCycle)=(drx-StartOffset)mod (drx-ShortCycle). Condition 1 (626a, 626b):

Upon the expiry of drx-ShortCycleTimer, or if a DRX short cycle is not configured, the Rx UE may use the DRX long cycle with the triggering condition below (referred to in FIG. 6 as "Condition 2" 628a, 628b) for the start of the On Duration. Again, the On Duration may begin after the certain slot offset, which may be determined for the network access interface by the network access interface DRX slot offset 612 parameter (e.g., the Uu drx-SlotOffset parameter), or for the sidelink interface by the sidelink interface DRX slot offset 614 parameter (e.g., the sl-drx-slot-Offset parameter).

[(SFN×10)+subframe number]mod(drx-LongCycle)= (drx-StartOffset). Condition 2 (628a, 628b):

As illustrated in FIG. 6, the network access interface DRX short cycle 622 and sidelink interface DRX cycle 610 are not aligned. Similarly, the network access interface DRX long cycle 608 and sidelink interface DRX cycle 610 are not aligned. At least two approaches to obtaining network access interface DRX and sidelink interface DRX alignment may be considered. Returning to FIG. 5 for illustrative purposes, a Tx UE (a sidelink Tx UE, an SL Tx UE) (e.g., first wireless communication device 504) and an Rx UE (a sidelink Rx UE, an SL Rx UE) (e.g., second wireless communication device 510) may communicate with each other using sidelink (e.g., via a PC5 interface 514, a sidelink interface). The Tx UE (e.g., first wireless communication device 504) may also communicate with a first network access node 502 via a first network access interface 506. The Rx UE (e.g., second wireless communication device 510) may also communicate with a second network access node 508 via a second network access interface 512.

In a first approach, the second network access node 508 having the Rx UE (e.g., second wireless communication device 510) camped thereon may align a network access interface DRX cycle of the Rx UE with a sidelink interface DRX cycle of the Rx UE. In a second approach, the first network access node 502 having the Tx UE (e.g., first wireless communication device 504) camped thereon may align the sidelink interface DRX cycle of the Rx UE with the network access interface DRX cycle of the Rx UE. However, sometimes, the alignment between network access interface DRX cycle and sidelink interface DRX cycle may not be possible by utilizing only the first approach or the second approach. In utilizing the first approach alone, the alignment between a network access interface DRX cycle and a sidelink interface DRX cycle of a given Rx UE may not be possible. For example, it may not be possible for the second network access node 508 to align the given Rx UE's (e.g., second wireless communication device 510) network access interface DRX cycle with the given Rx UE's sidelink interface DRX cycle as in the first approach. By way of further example, it may not be possible for the first network access node 502 to align the given Rx UE's sidelink interface DRX cycle with the given Rx UE's network access interface DRX cycle.

According to some aspects, alignment between network access interface DRX cycle and sidelink interface DRX cycle may be possible by utilizing a combination of the first approach (i.e., Rx UE's second network access node 508 aligns the network access interface DRX cycle of the Rx UE with the sidelink interface DRX cycle of the Rx UE) and the second approach (i.e., Tx UE's first network access node 502 aligns the sidelink interface DRX cycle of the Rx UE with the network access interface DRX cycle of the Rx UE). According to some aspects, a given network access node (e.g., first network access node 502 or second network access node 508) may utilize a single network access interface DRX candidate or a single sidelink interface DRX candidate for alignment of the network access interface DRX cycle with the sidelink interface DRX cycle, or vice versa. However, according to some aspects described herein, a given network access node may utilize multiple network access interface DRX candidates or multiple sidelink interface DRX candidates to align the network access interface DRX cycle with the sidelink interface DRX cycle, or vice versa. Therefore, aspects herein may employ the transmissions of "assistance information" to provide more than one network access interface DRX candidate or more than one sidelink interface DRX candidate for alignment of the network access interface DRX cycle with the sidelink interface DRX cycle of a given Rx UE, or vice versa.

Instead of providing a single option (e.g., a single DRX candidate, a single DRX configuration, a single set of the drx-slot-Offset parameter, drx-short-Cycle parameter, drx-longCycleStartOffset parameter, and/or the drx-Start-Offset parameter), aspects described herein may offer a plurality of DRX candidates (e.g., a plurality of DRX candidate configurations, a plurality of sets of DRX configuration parameters) for the network access interface DRX configuration, for example The plurality of DRX candidates may be provided in one or more "assistance information" messages. The assistance information messages may be carried, for example, by RRC signaling or a medium access control control-element (MAC CE). By offering a plurality of DRX candidates, a sidelink transmitter UEs network access node (e.g., where the transmitter UE may be exemplified by the first wireless communication device 504 and the sidelink transmitter UE's network access node may be exemplified by the first network access node 502), may use one of the plurality of DRX candidates (e.g., one of the plurality of DRX candidate configurations, one of the plurality of sets of DRX configuration parameters) to align the network access interface DRX cycle of sidelink receiver UE with a sidelink interface DRX cycle of the sidelink receiver UE if another one of the plurality of DRX candidates is unavailable.

Because a selected sidelink interface DRX cycle may align with a network access interface DRX cycle configured according to the parameters of one of the plurality of DRX candidates, where the sidelink receiver UE's network access node may provide the plurality of DRX candidates (e.g., the second network access node 508 of FIG. 5), the sidelink receiver UE's network access node may be able to align one of the plurality of network access interface DRX cycles with the selected sidelink interface DRX cycle, or vice versa.

According to some aspects, a list of the plurality of network access interface DRX candidates may be sorted in an order of preference (e.g., a descending order of preference). According to some aspects, the list of the plurality of network access interface DRX candidates may be sorted in an order of preference as established by the sidelink receiver UE's network access node. According to some aspects, each network access interface DRX candidate may include at least one value corresponding to at least one of: a network access interface DRX slot offset (e.g., a Uu drx-slot-Offset) parameter defining a slot offset in a time domain from a configured network access interface DRX short cycle start time, a network access interface DRX start offset (e.g., a Uu drx-Start-Offset) parameter defining an offset in the time domain from the configured network access interface DRX short cycle start time, and/or a network access interface DRX short cycle (e.g., a Uu drx-ShortCycle) parameter defining a number of repetitions of the configured network access interface DRX short cycle. A sidelink interface DRX candidate in a plurality of sidelink interface DRX candidates, if utilized, may include sidelink interface DRX parameters that correspond to the above exemplified network access interface DRX parameters.

The assistance information may include other information that may help the Tx UE's gNB align the sidelink interface DRX cycle and network access interface DRX cycle of the Rx UE. For example, in addition to the plurality of network access interface DRX candidates, the assistance information may include a preferred sidelink interface DRX candidate (e.g., a plurality of PC5 SL DRX candidate configurations, a plurality of sets of PC5 SL DRX configuration parameters) provided by the Rx UE and/or the Rx UE's gNB. The assistance information may additionally, or alternatively, include a list of existing sidelink interface DRX candidates from other Tx UEs (e.g., Tx UEs other than the Tx UE 704).

The signaling of the plurality of DRX candidates as assistance information may correspond to the signaling of assistance information at 710, 712, 714 as shown and described in connection with FIG. 7, below.

Figure 7:
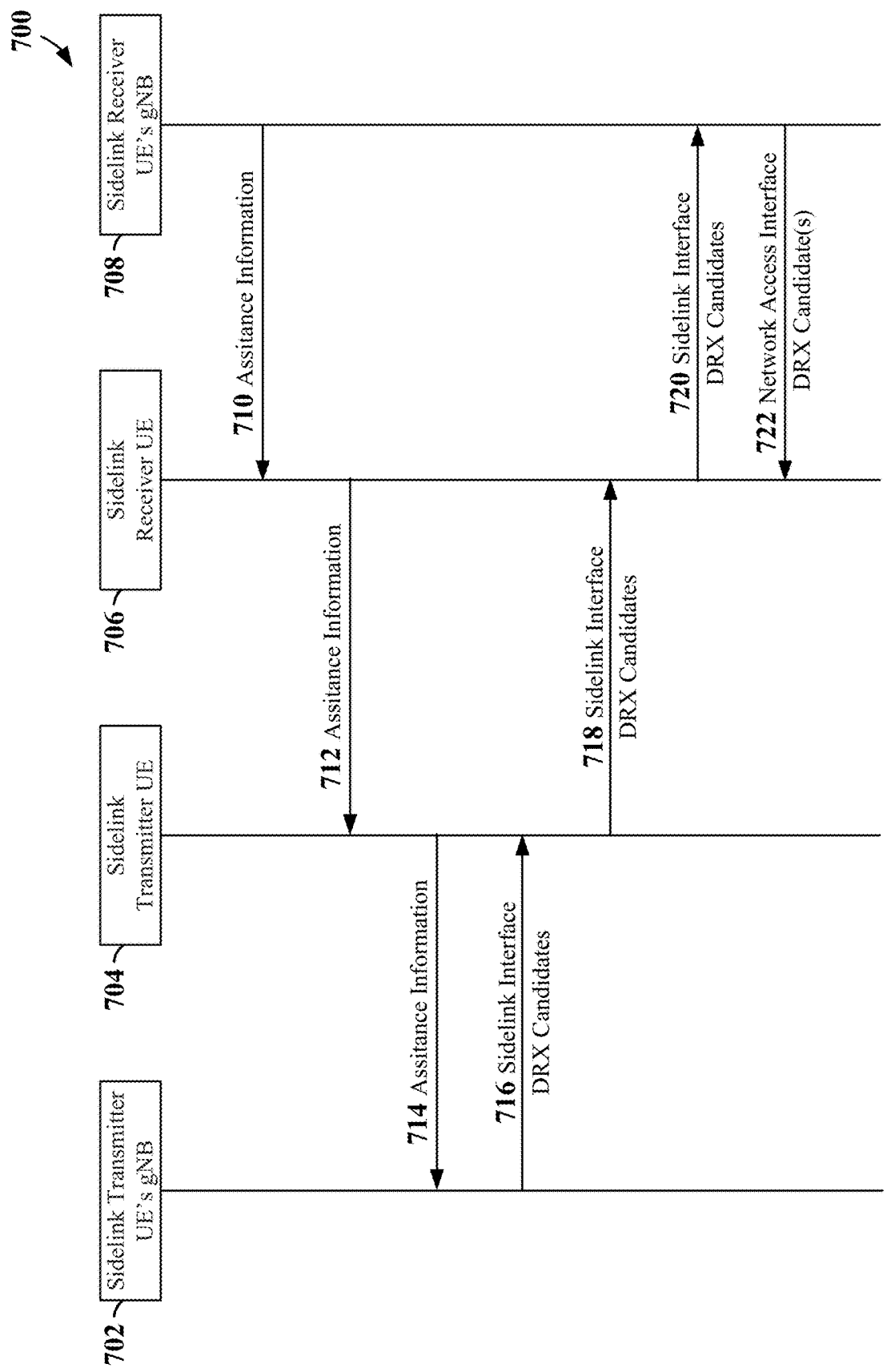
FIG. 7 is a call flow diagram depicting an exchange of assistance information, sidelink interface DRX configuration information, and network access interface DRX configuration information among a first network access node, a sidelink transmitter UE, a sidelink receiver UE, and a second network access node according to some aspects.

FIG. 7 is a call flow diagram depicting an exchange of assistance information, sidelink interface DRX configuration information, and network access interface DRX configuration information among a first gNB 702 (i.e., a sidelink transmitter UE's gNB), a sidelink transmitter UE 704, a sidelink receiver UE 706, and a second gNB 708 (i.e., the sidelink receiver UE's gNB) according to some aspects. At 710, the second gNB 708 may send assistance information to the Rx UE 706. The assistance information may include a plurality of options for a network access interface DRX configuration (e.g., a plurality of DRX candidates, a plurality of DRX candidate configurations, a plurality of sets of DRX configuration parameters). At 712, the Rx UE 706 may send the assistance information to the Tx UE 704. At 714, the Tx UE may send the assistance information to the first gNB 702.

The assistance information may contain information in addition to the plurality of options for the network access interface DRX configuration. For example, the information in addition to the plurality of options for the network access interface DRX configuration may further assist the first gNB 702 (i.e., the Tx UE's gNB) in setting/selecting the sidelink interface DRX configuration for the Rx UE 706. For example, the information in addition to the plurality of network access interface DRX candidates (e.g., network access interface DRX candidate configurations) may include a preferred sidelink interface DRX configuration provided by the Rx UE 706 and/or the second gNB (i.e., the Rx UE's gNB). By way of further example, the information in addition to the plurality of options represented by the plurality of network access interface DRX candidates may include a list of existing sidelink interface DRX configurations from other Tx UEs (e.g., Tx UEs other than the Tx UE 704).

According to some aspects, a list of the plurality of network access interface DRX candidates may be conveyed using Layer 1 (L1), Layer 2 (L2), and/or Layer 3 (L3) signaling.

Concerning L3 signaling of a plurality of network access interface DRX candidates (e.g., a plurality of DRX candidates, a plurality of DRX candidate configurations, a plurality of sets of DRX configuration parameters), an L3 RRC message may include a listing of network access interface DRX candidates. For example, an L3 signaling (message) may include all of the plurality of network access interface DRX candidates or may include only those parameters related to the alignment of a network access interface DRX cycle with a sidelink interface DRX cycle. The L3 signaling (message) may include short DRX candidates (e.g., network access interface DRX short cycle candidate configurations) if, for example, the Rx UE is configured for DRX short cycle operation. As stated earlier, DRX short cycle operation may be optional.

The following pseudo-code may provide an example of an L3 signaling (message) that may include all of the plurality of network access interface DRX long cycle candidate configurations and network access interface DRX short cycle candidate configurations related to alignment according to some aspects of the disclosure.

```
ASN1START
TAG-DRX-CONFIG-START
DRX-Config::=SEQUENCE {
   drx-onDurationTimer,
   drx-InactivityTimer,
   drx-HARQ-RTT-TimerDL,
   drx-HARQ-RTT-TimerUL,
   drx-RetransmissionTimerDL,
   drx-RetransmissionTimerUL,
   sl-drx-Offset SEQUENCE {
      drx-LongCycleStartOffset1, drx-SlotOffset1, short-
         DRX1,
      drx-LongCycleStartOffset2, drx-SlotOffset2, short-
         DRX2,
      . . .
   }
}
-- TAG-DRX-CONFIG-STOP
-- ASN1STOP
```

The following pseudo-code may provide an example of an L3 signaling (message) that may include only the plurality of network access interface DRX long cycle candidate configurations and network access interface DRX short cycle candidate configurations related to alignment according to some aspects of the disclosure.

```
ASN1START
TAG-DRX-CONFIG-START
DRX-Config::=SEQUENCE {
   sl-drx-Offset SEQUENCE {
      drx-LongCycleStartOffset1, drx-SlotOffset1, short-
         DRX1,
      drx-LongCycleStartOffset2, drx-SlotOffset2, short-
         DRX2,
      . . .
   }
}
```

-- TAG-DRX-CONFIG-STOP
-- ASN1STOP

Figure 8:
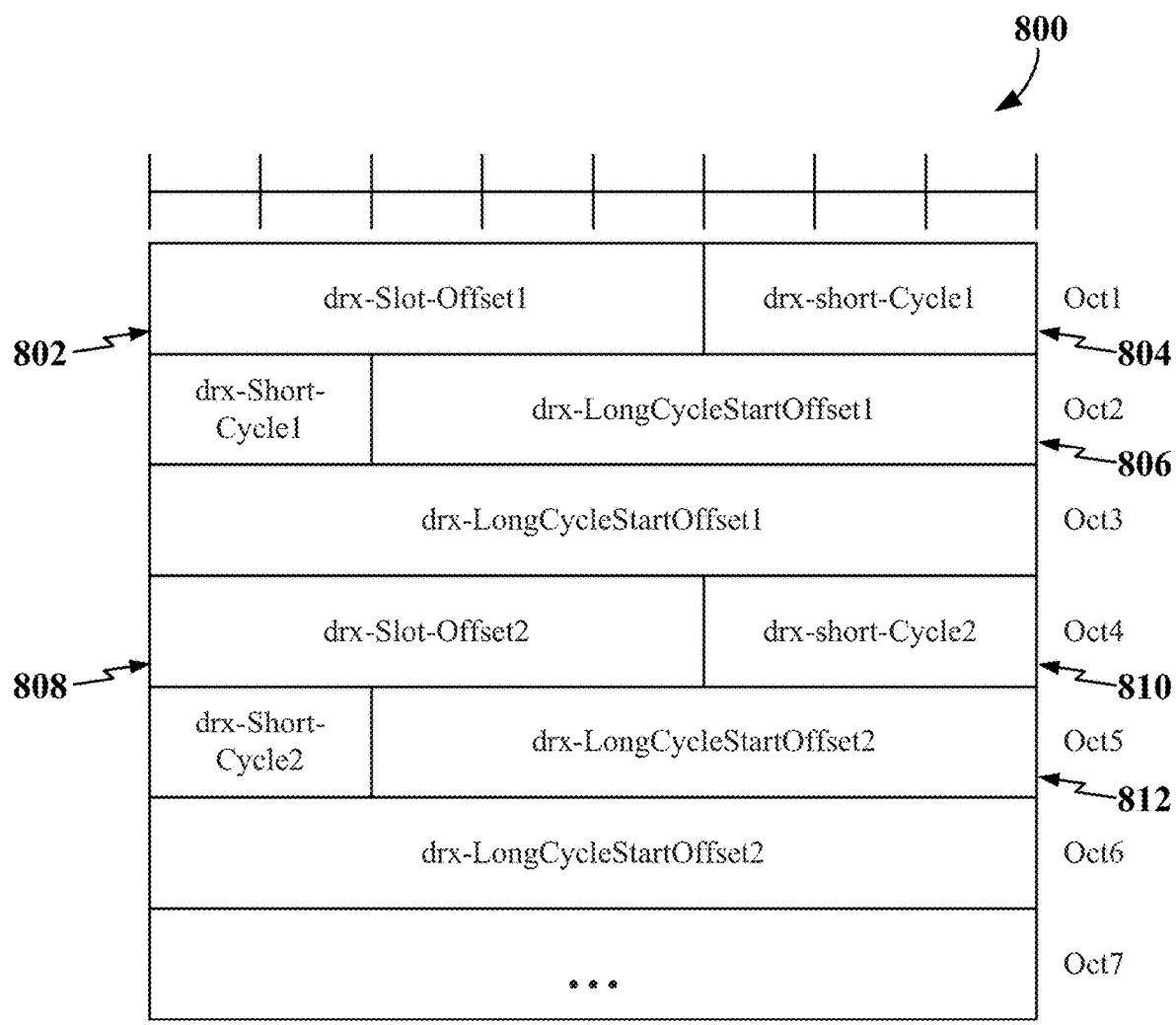
FIG. 8 is an example of a medium access control-control element (MAC CE) format according to some aspects.

As indicated in both preceding examples, the list of network access interface long DRX candidate configurations may include: drx-LongCycleStartOffset1, drx-SlotOffset1, drx-LongCycleStartOffset2, drx-SlotOffset2, .... The list of network access interface short DRX candidate configurations may include shortDRX1, shortDRX2, With regard to L2 signaling of a plurality of network access interface DRX candidates (e.g., a plurality of DRX candidates, a plurality of DRX candidate configurations, a plurality of sets of DRX configuration parameters), a MAC CE may convey network access interface DRX cycle candidate configurations relevant to the alignment of DRX long cycles, DRX short cycles (if present), and sidelink interface DRX cycles. FIG. 8 is an example of a MAC CE 800 format that may convey such candidate configurations, according to some aspects. The exemplary MAC CE 800 format may include one or more five-bit DRX slot offset parameter values (e.g., drx-slot-Offset1 802, drx-slot-Offset2 808, ... ), one or more respective five-bit DRX short cycle parameter values (e.g., drx-short-Cycle1 804, drx-short-Cycle2 810, ... ), and/or one or more respective fourteen-bit DRX long cycle start offset parameter values (e.g., drx-LongCycleStartOffset1 806, drx-LongCycleStartOffset2 812, ... ). The organization and number of bits of the various parameters in the MAC CE 800 format of FIG. 8 are provided for illustrative and non-limiting purposes. Additional network access interface DRX candidate configurations are indicated by an ellipsis to avoid redundancy.

According to one aspect, the MAC CE 800 format of FIG. 8 may be designed to have a variable length in contemplation of dynamically adding additional network access interface DRX candidate configurations (e.g., drx-slot-Offset3, drx-short-Cycle3, drx-LongCycleStartOffset3, drx-slot-Offset4, drx-short-Cycle4, drx-LongCycleStartOffset4, etc.). As noted above, short DRX configuration candidate information may be included if the Rx UE is configured for DRX short cycle operation. If the Rx UE is not configured for DRX short cycle operation, the short DRX configuration candidate information may be omitted. In one example, not shown, a given MAC CE parameter may represent one of a plurality of parameter values. For example, drx-slot-Offset may have 32 values (e.g., 32 five-bit drx-slot-Offset values) and the network access node may inform the Rx UE that a given updated value in the MAC CE 800 format is one of n values in a subset, where n is a positive integer, for example. In one example, not shown, the drx-slot-Offset parameter (or one or more other parameters) in a given MAC CE may be identified by a pointer value. In such an example, the pointer value may be conveyed by the MAC CE instead of the actual values of the parameter(s).

Concerning L1 and/or L2 signaling of a plurality of network access interface DRX candidates (e.g., a plurality of DRX candidates, a plurality of DRX candidate configurations, a plurality of sets of DRX configuration parameters), the RRC may configure a set of parameter values for, for example, drx-slot-Offset, drx-short-Cycle, and/or drx-LongCycleStartOffset, and one or more pointer values corresponding to one or more respective actual parameter values, or lists of parameter values, may be conveyed in the L1 and/or L2 signaling, instead of conveying the actual parameter values, for example. Utilizing pointer values to point to one or more sets of actual values in the L1 and/or L2 signaling may minimize overhead.

According to one aspect, a plurality of DRX candidates (e.g., network access interface DRX candidates, sidelink interface DRX candidates) may be provided in a list. For example, the plurality of network access interface DRX candidate configurations may be provided in a list sorted in order of preference. In some aspects, a network access node may establish the list and/or order of preference (e.g., the network access node having a network access interface with the Rx UE). The list of DRX candidates may be sorted in descending order of preference. The signaling of the plurality of sidelink interface DRX candidates may correspond to the signaling of the list of sidelink interface DRX candidates at 716, 718, and 720 as shown and described in connection with FIG. 7. The signaling of the list of sidelink interface DRX candidate configurations may also include other information, which may help the Tx UE's gNB to set the sidelink interface DRX configuration of the Rx UE. For example, list of sidelink interface DRX candidates may also include a preferred network access interface DRX configuration provided by the Tx UE or the Tx UE's gNB.

According to some aspects, a list of a plurality of sidelink interface DRX candidates may be conveyed using L1, L2, and/or L3 signaling.

Concerning L3 signaling of a plurality of sidelink interface DRX candidates (e.g., a plurality of DRX candidates, a plurality of DRX candidate configurations, a plurality of sets of DRX configuration parameters), an L3 RRC message may include a listing of sidelink interface DRX candidates. For example, an L3 RRC message may include all of the plurality of sidelink interface DRX candidates or may include only those parameters related to the alignment of a network access interface DRX cycle with a sidelink interface DRX cycle. The L3 signaling (message) may include short DRX candidates (e.g., network access interface DRX short cycle candidate configurations) if, for example, the Rx UE is configured for DRX short cycle operation. As stated earlier, DRX short cycle operation may be optional.

The following pseudo code may provide an example of an L3 signaling (message) that may include all of the plurality of sidelink interface DRX cycle candidate configurations related to alignment according to some aspects of the disclosure.

Sl-DRX-Config::=SEQUENCE {
    sl-drx-onDurationTimer,
    sl-drx-InactivityTimer,
    sl-drx-HARQ-RTT-Timer,
    sl-drx-RetransmissionTimer,
    sl-drx-Offset=SEQUENCE{
    sl-drx-StartOffset1,sl-drx-SlotOffset1,sl-drx-Cycle1,
    sl-drx-StartOffset2,sl-drx-SlotOffset2,sl-drx-Cycle2,
    ...
    }
}

The following pseudo code may provide an example of an L3 signaling (message) that may include only the plurality of sidelink interface DRX cycle candidate configurations related to alignment according to some aspects of the disclosure.

Sl-DRX-Config::=SEQUENCE {
    sl-drx-Offset=SEQUENCE{
    sl-drx-StartOffset1, sl-drx-SlotOffset1, sl-drx-Cycle1,
    sl-drx-StartOffset2, sl-drx-SlotOffset2, sl-drx-Cycle2,
    ...
    }
}

Figure 9:
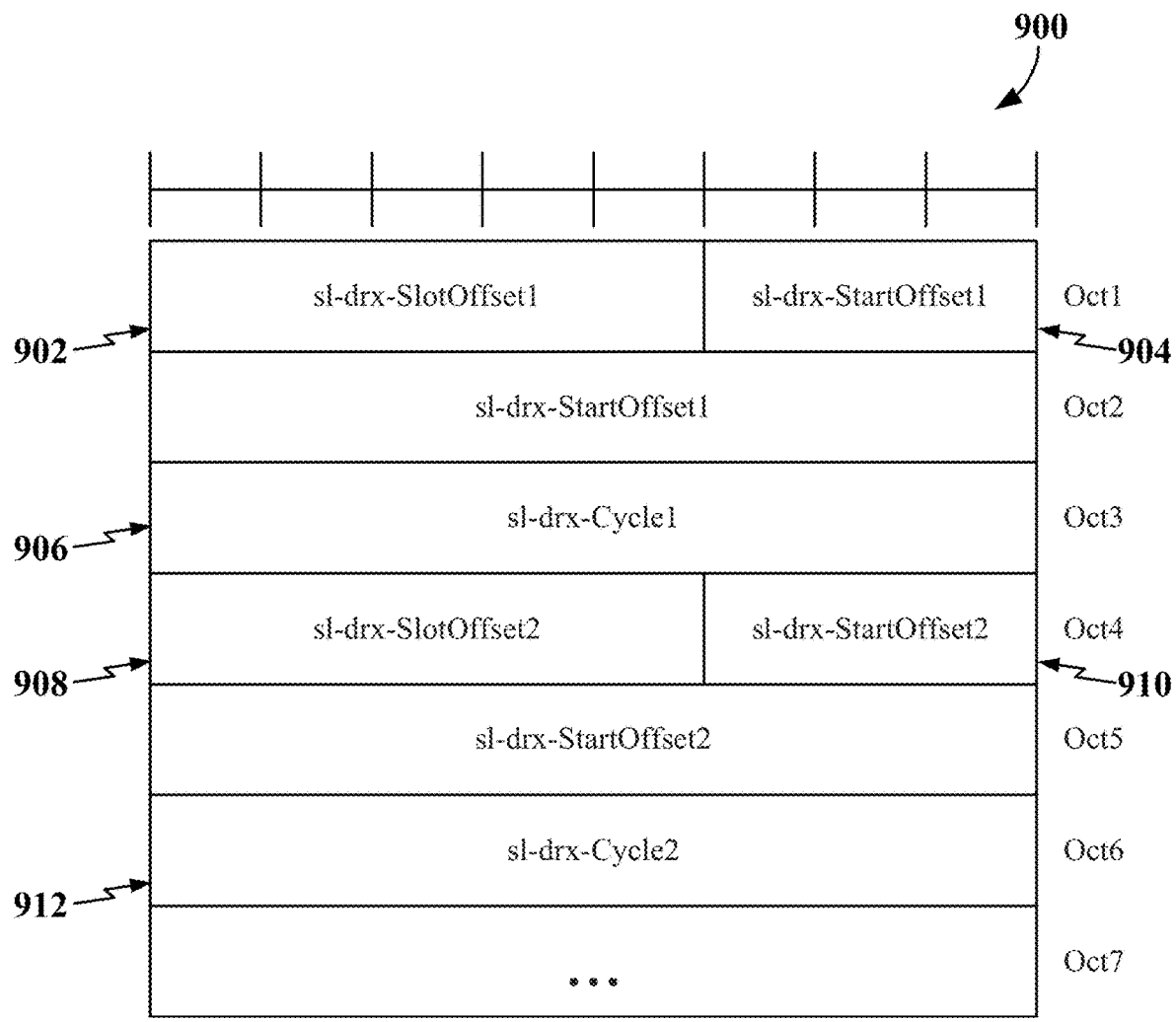
FIG. 9 is an example of a MAC CE format according to some aspects.

With regard to L2 signaling of a plurality of sidelink interface DRX candidates (e.g., a plurality of DRX candidates, a plurality of DRX candidate configurations, a plurality of sets of DRX configuration parameters), a MAC CE may convey sidelink interface DRX cycle candidate configurations relevant to the alignment of DRX long cycles, DRX short cycles (if present), and sidelink interface DRX cycles. FIG. 9 is an example of a MAC CE 900 format that may convey such candidate configurations, according to some aspects. The exemplary MAC CE 900 format may include one or more five-bit sidelink interface DRX slot offset parameter values (e.g., sl-drx-slot-Offset1 902, sl-drx-slot-Offset2 908, . . . ), one or more respective eleven bit sidelink interface DRX start offset parameter values (e.g., sl-drx-StartOffset1 904, sl-drx-StartOffset2 910, . . . ), and/or one or more respective eight bit sidelink interface DRX cycle parameter values (e.g., sl-drx-Cycle1 906, sl-drx-Cycle2 912, . . . ). The exemplary MAC CE 900 format may include two sidelink interface DRX candidate configurations with additional sidelink interface DRX candidate configurations indicated by an ellipsis to avoid redundancy. The organization and number of bits of the various parameters in the MAC CE 900 format of FIG. 9 are provided for illustrative and non-limiting purposes. Additional sidelink interface DRX candidate configurations are indicated by an ellipsis to avoid redundancy.

According to one aspect, the MAC CE 900 format of FIG. 9 may be designed to have a variable length in contemplation of dynamically adding additional sidelink interface DRX candidate configurations (e.g., sl-drx-slot-Offset3, sl-drx-StartOffset3, sl-drx-Cycle3, etc.). In one example, not shown, a given MAC CE parameter may represent one of a plurality of the parameter values. For example, sl-drx-slot-Offset may have 32 values (e.g., 32 five-bit sl-drx-slot-Offset values), and the network access node may inform the Rx UE that a given updated value in the MAC CE 900 format is one of n values in a subset, where n is a positive integer, for example. In one example, not shown, the sl-drx-slot-Offset parameter (or one or more other parameters) in a given MAC CE may be identified by a pointer value. In such an example, the pointer value may be conveyed by the MAC CE instead of the actual values of the parameter(s).

Concerning L1 and/or L2 signaling of a plurality of sidelink interface DRX candidates (e.g., a plurality of DRX candidates, a plurality of DRX candidate configurations, a plurality of sets of DRX configuration parameters), the RRC may configure a set of parameter values for, for example, sl-drx-Start-Offset, sl-drx-Cycle, and/or sl-drx-SlotOffset, and one or more pointer values corresponding to one or more respective actual parameter values, or lists of parameter values, may be conveyed in the L1 and/or L2 signaling, instead of conveying the actual parameter values, for example. Utilizing pointer values to point to one or more sets of actual values in the L1 and/or L2 signaling may minimize overhead.

Figure 10:
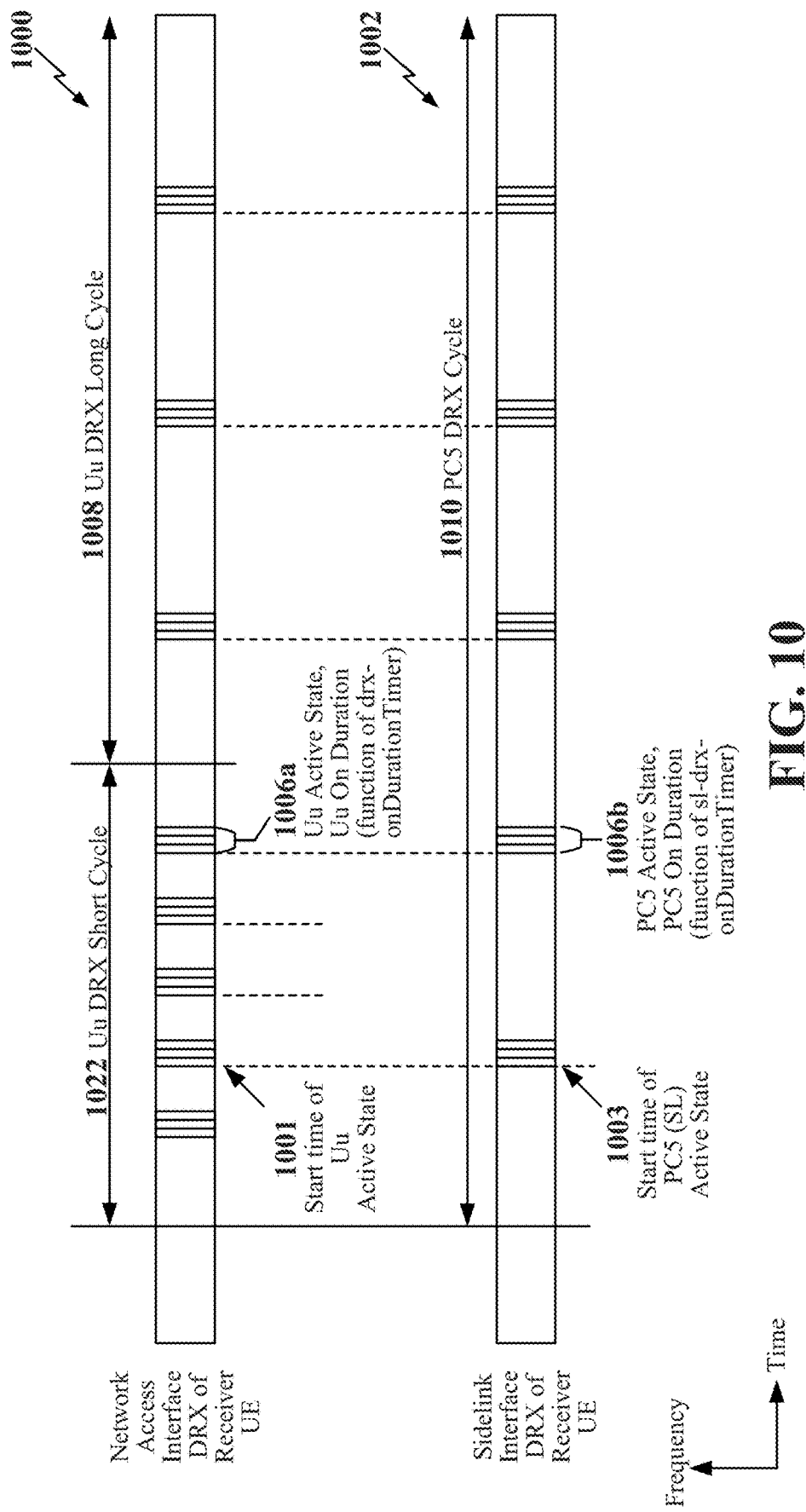
FIG. 10 is an illustration of frequency-time resources comparing network access interface DRX cycles and sidelink interface DRX cycles at a sidelink receiver UE according to some aspects.

FIG. 10 is an illustration of frequency-time resources comparing network access interface (e.g., Uu interface) DRX cycles 1000 and sidelink interface (e.g., PC5 interface) DRX cycles 1002 at an Rx UE (e.g., either of the first wireless communication device 504 or the second wireless communication device 510 as illustrated and described in connection with FIG. 5) according to some aspects. In FIG. 10, frequency is displayed along the vertical axis, and time is displayed along the horizontal axis. The relative position between the network access interface DRX cycles 1000 and the sidelink interface DRX cycles 1002 along the vertical frequency axis (i.e., one at higher frequencies than the other) is for illustrative and non-limiting purposes.

In FIG. 10, the duration of the network access interface DRX Active state 1006a (also referred to as the network access interface DRX On Duration) and the sidelink interface DRX Active state 1006b (also referred to as the sidelink interface DRX On Duration) have the same time scale to illustrate the aligned nature of the start of a network access interface DRX Active state 1006a with the start of a sidelink interface DRX Active state 1006b.

In FIG. 10, the duration of the network access interface DRX Active state 1006a (also referred to as the Uu On Duration or the network access interface On Duration) may be a function of a configurable network access interface DRX on duration timer (e.g., Uu drx-onDurationTimer) parameter. The duration of the sidelink interface DRX Active state 1006b (also referred to as the sidelink interface On Duration, PC5 On Duration, or the SL On Duration) may be a function of a configurable sidelink interface DRX On Duration Timer (e.g., PC5 sl-drx-onDurationTimer) parameter.

To align the start time 1001 of the network access interface DRX Active state 1006a with the start time 1003 of the sidelink interface DRX Active state 1006b, the network access node of the Tx UE (e.g., the first network access node 502 of FIG. 5) may configure/re-configure/update/change the sidelink interface DRX slot offset of the Rx UE (e.g., the second wireless communication device 510 of FIG. 5) by updating the sidelink interface DRX slot offset 614 parameter value (e.g., sl-drx-startOffset parameter value) (e.g., associated with Condition 1 626b of FIG. 6) of the Rx UE and thereby change the start time of the sidelink interface DRX cycle to align the start time 1001 of the network access interface DRX Active state 1006a (i.e., the network access interface DRX Active state start time) with the start time 1003 of the sidelink interface DRX Active state 1006b (i.e., the sidelink interface DRX Active state start time). Alternatively, the network access node of the Rx UE (e.g., the second network access node 508 of FIG. 5) may configure/re-configure/update/change the network access interface DRX slot offset of the Rx UE (e.g., the second wireless communication device 510 of FIG. 5) by updating the network access interface DRX slot offset 612 parameter value (e.g., Uu drx-SlotOffset parameter value) of the Rx UE and thereby change the start time of the network access interface DRX cycle to align the start time 1001 of the network access interface DRX Active state 1006a (i.e., the network access interface DRX Active state start time) with the start time 1003 of the sidelink interface DRX Active state 1006b (i.e., the sidelink interface DRX Active state start time). In FIG. 10, the network access interface DRX sleep states (also referred to as the Uu Off states or the network access interface Off states) are represented by the spaces between adjacent network access interface DRX Active state 1006a representations. The sidelink interface DRX sleep states (or sidelink interface Off states or PC5 Off states) are represented by the spaces between adjacent sidelink interface DRX Active state 1006b representations. The network access interface DRX sleep state and sidelink interface DRX sleep state representations are not labeled in FIG. 10 to avoid cluttering the drawing.

In the example of FIG. 10, network access interface DRX of the Rx UE has a network access interface DRX short cycle 1022 and a network access interface DRX long cycle 1008. According to one aspect, to align the network access interface DRX long cycle 1008 with the sidelink interface DRX cycle 1010 of the Rx UE (e.g., second wireless communication device 510 of FIG. 5), a gNB of the Rx UE (e.g., the second network access node 508 of the second wireless communication device 510 of FIG. 5) may disable or ignore the network access interface DRX short cycle 1022 and update and align the sidelink interface DRX cycle 1010 with the network access interface DRX long cycle 1008 of the Rx UE.

According to another aspect, the gNb of the Tx UE (e.g., the first network access node 502 of the first wireless communication device 504 of FIG. 5) may cause the sidelink interface DRX cycle 1010 and the network access interface DRX long cycle 1008 of the Rx UE (e.g., the second wireless communication device 510 of FIG. 5) to be integer multiples of the network access interface DRX short cycle 1022. In other words, the gNb of the Tx UE may cause the sidelink interface DRX cycle 1010 to correspond to M times the network access interface DRX short cycle 1022 and cause the network access interface DRX long cycle 1008 to correspond to N times the network access interface DRX short cycle 1022. To ensure that M and N are integer multiples of one another, M mod N=0 or N mod M=0. In other words, the first integer number (M) divided by the second integer number (N) leaves no remainder.

Figure 11:
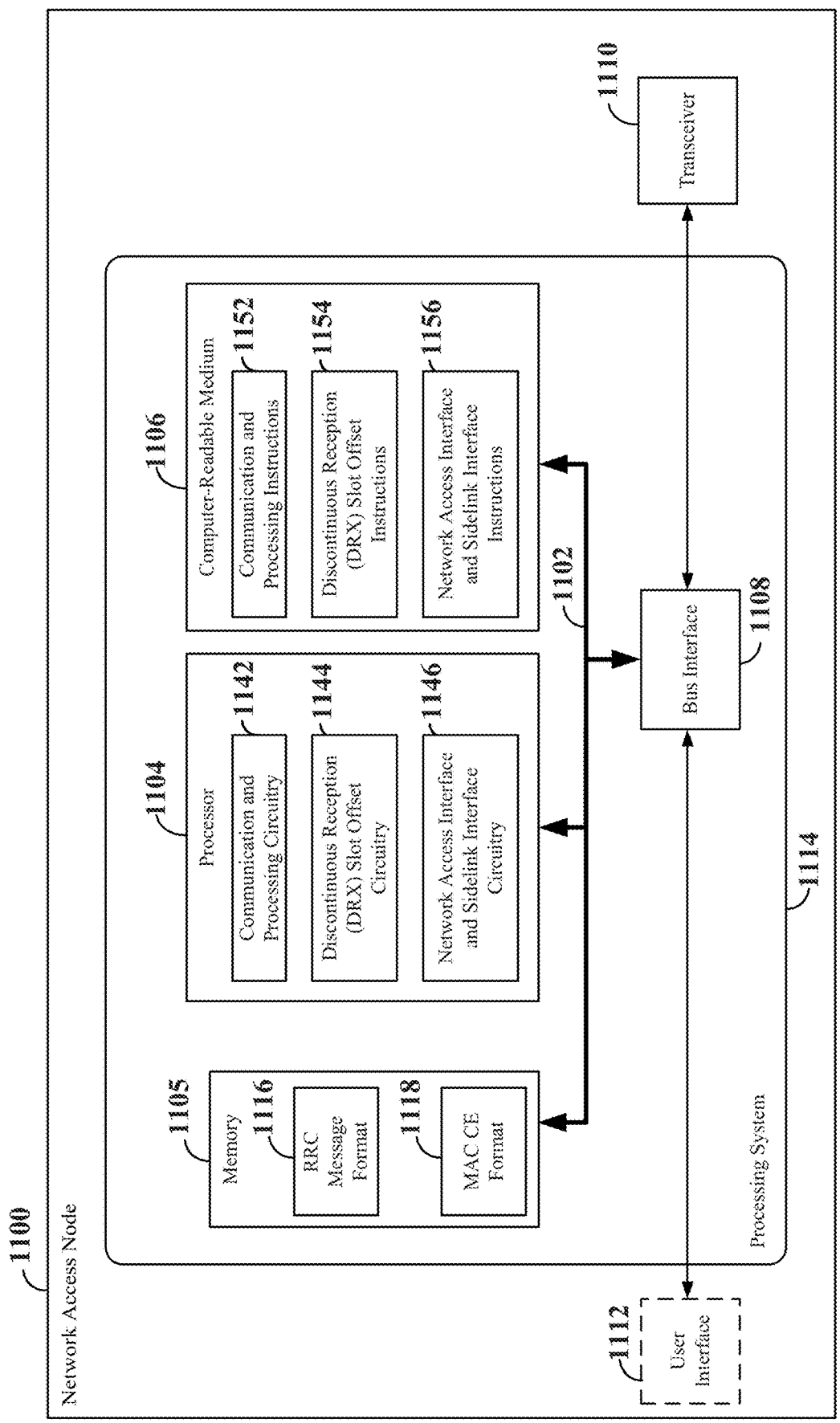
FIG. 11 is a block diagram illustrating an example of a hardware implementation of a network access node employing a processing system according to some aspects.

FIG. 11 is a block diagram illustrating an example of a hardware implementation of network access node 1100 employing a processing system 1114 according to some aspects. For example, the network access node 1100 may correspond to the first network access node 502 of FIG. 5, the second network access node 508 of FIG. 5, a base station, a gNB, or a scheduling entity, as shown and described above in reference to FIGS. 1, 3, 5, and/or 7.

The network access node 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network access node 1100 may be configured to perform any one or more of the functions described herein. That is, the processor 1104, as utilized in the network access node 1100, may be used to implement any one or more of the processes and procedures described below.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further.

A bus interface 1108 provides an interface between the bus 1102 and a transceiver 1110. The transceiver 1110 provides a communication interface or a means for communicating with various other apparatus over a transmission medium (e.g., air interface). Depending upon the nature of the apparatus, a user interface 1112 (e.g., keypad, display, touch screen, speaker, microphone, control knobs, etc.) may also be provided. Of course, such a user interface 1112 is optional, and may be omitted in some examples.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software. For example, the memory 1105 may store one or more SCI-2 format(s) 1116 and one or more MAC CE format(s) 1118 used by the processor 1104 in connection with the generation of SL-PRS resource reservation messages in sidelink positioning.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. In some examples, the computer-readable medium 1106 may be part of the memory 1105. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include communication and processing circuitry 1142, configured to communicate with one or more sidelink devices (e.g., other UEs) via respective sidelinks (e.g., PC5 interfaces, sidelink interfaces). In addition, the communication and processing circuitry 1142 may be configured to communicate with a base station (e.g., gNB or eNB) via a network access interface. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1142 may include one or more transmit/receive chains.

In some implementations where the communication involves receiving information, the communication and processing circuitry 1142 may obtain information from a component of the network access node 1100 (e.g., from the transceiver 1110 that receives the information via radio frequency signaling or some other type of signaling suitable for the applicable communication medium), process (e.g., decode) the information, and output the processed information. For example, the communication and processing circuitry 1142 may output the information to another component of the processor 1104, to the memory 1105, or to the bus interface 1108. In some examples, the communication and processing circuitry 1142 may receive one or more of signals, messages, other information, or any combination thereof. In some examples, the communication and processing circuitry 1142 may receive information via one or more channels. In some examples, the communication and processing circuitry 1142 may include functionality for a means for receiving. In some examples, the communication and processing circuitry 1142 may include functionality for a means for processing, including a means for demodulating, a means for decoding, etc.

In some implementations where the communication involves sending (e.g., transmitting) information, the communication and processing circuitry 1142 may obtain information (e.g., from another component of the processor 1104, the memory 1105, or the bus interface 1108), process (e.g., modulate, encode, etc.) the information, and output the processed information. For example, the communication and processing circuitry 1142 may output the information to the transceiver 1110 (e.g., that transmits the information via radio frequency signaling or some other type of signaling suitable for the applicable communication medium). In some examples, the communication and processing circuitry 1142 may send one or more signals, messages, other information, or any combination thereof. In some examples, the communication and processing circuitry 1142 may send information via one or more channels. In some examples, the communication and processing circuitry 1142 may include functionality for a means for sending (e.g., a means for transmitting). In some examples, the communication and processing circuitry 1142 may include functionality for a means for generating, including a means for modulating, a means for encoding, etc.

The network access node 1100 (e.g., the transceiver 1110 of the network access node 1100) may be communicatively coupled with a sidelink receiver user equipment (UE) on a first network access interface (e.g., a first Uu interface). Furthermore, the sidelink receiver UE may include a sidelink interface (e.g., a PC5 interface). In some examples the sidelink receiver UE (also referred to as the receiver UE and the Rx UE herein) may be communicatively coupled to a sidelink transmitter UE (also referred to as the transmitter UE and the Tx UE herein) on a sidelink interface (e.g., a PC5 interface). In some examples, the Tx UE may be communicatively coupled with a second network access node on a second network access interface.

The processor 1104 may further include discontinuous reception (DRX) slot offset circuitry 1144, configured, for example, to obtain a network access interface discontinuous reception (DRX) slot offset (e.g., a Uu drx-slot-Offset) value corresponding to a shift in a network access interface DRX Active state start time (e.g., a network access interface DRX Active state start time) of an receiving UE (e.g., a sidelink Rx UE) that configures an alignment of a sidelink interface DRX Active state start time (e.g., a sidelink interface DRX Active state start time) and the network access interface DRX Active state start time of the Rx UE; and, in combination with the transceiver 1110, to transmit the network access interface DRX slot offset value to the Rx UE. The DRX slot offset circuitry 1144, in combination with the transceiver 1110, may further be configured to transmit the network access interface DRX slot offset value to the Rx UE in a radio resource control (RRC) message in Layer 3 signaling or may further be configured to transmit the network access interface DRX slot offset value to the Rx UE in a medium access control control-element (MAC CE) in Layer 2 signaling. In some examples, the DRX slot offset circuitry 1144, in combination with the transceiver 1110, may further be configured to transmit a plurality of network access interface DRX candidate configurations (e.g., a plurality of network access interface DRX candidate configurations) to the second network access node via the sideling interface (e.g., the PC5 interface). The sidelink interface may be an interface between the Rx UE and the Tx UE.

According to some aspects, each of the plurality of network access interface DRX candidate configurations includes at least one value corresponding to at least one of: a network access interface DRX slot offset parameter defining a slot offset in a time domain from a configured network access interface DRX short cycle start time, a network access interface DRX start offset parameter defining an offset in the time domain from the configured network access interface DRX short cycle start time, and/or a network access interface DRX short cycle parameter defining a number of repetitions of the configured network access interface DRX short cycle.

The DRX slot offset circuitry 1144, in combination with the transceiver 1110, may still further be configured to transmit the plurality of network access interface DRX candidate configurations to the second network access node via the sidelink interface in Layer 1 or Layer 2 signaling using respective pointers that point to respective ones of the plurality of network access interface DRX candidate configurations (e.g., rather than transmitting the actual values of the parameters). According to some aspects, the plurality of network access interface DRX candidate configurations may be provided in a list sorted according to an order of preference established by the first network access node.

The DRX slot offset circuitry 1144, in combination with the transceiver 1110, may still further be configured to transmit the plurality of network access interface DRX candidate configurations to the Rx UE in a radio resource control (RRC) message in Layer 3 signaling or to transmit the plurality of network access interface DRX candidate configurations to the Rx UE in a medium access control control-element (MAC CE) in Layer 2 signaling.

In some examples, the transceiver 1110 may be communicatively coupled with a sidelink transmitter user equipment (Tx UE) on a first network access interface (e.g., a first Uu interface), where the Tx UE may be communicatively coupled to a sidelink receiver UE (Rx UE) on a sidelink interface (e.g., a PC5 interface). In some examples, the Rx UE may be communicatively coupled with a second network access node on a second network access interface (e.g., a second Uu interface). In such examples, the DRX slot offset circuitry 1144, in combination with the transceiver 1110, may be configured to obtain a sidelink interface discontinuous reception slot offset (e.g., a PC5 sl-drx-slot-Offset) value corresponding to a shift in a sidelink interface discontinuous reception (DRX) Active state start time (e.g., a sidelink interface DRX Active state start time) of the Rx UE that configures an alignment of the sidelink interface DRX Active state start time and a network access interface DRX Active state start time (e.g., a network access interface DRX Active state start time) of the Rx UE. The DRX slot offset circuitry 1144, in combination with the transceiver 1110, may still further be configured to transmit the sidelink interface DRX slot offset value to the Rx UE.

The DRX slot offset circuitry 1144, in combination with the transceiver 1110, may still further be configured to transmit the sidelink interface DRX slot offset value to the Rx UE in a radio resource control (RRC) message in Layer 3 signaling or transmit the sidelink interface DRX slot offset value to the Rx UE in a medium access control control-element (MAC CE) in Layer 2 signaling. In some examples, the DRX slot offset circuitry 1144, in combination with the transceiver 1110, may still further be configured to transmit a plurality of sidelink interface DRX candidate configurations to the second network access node via the sidelink interface (e.g., between the Rx UE and the Tx UE).

According to some aspects, each of the plurality of sidelink interface DRX candidate configurations may include at least one value corresponding to at least one of: a sidelink interface DRX slot offset parameter defining a slot offset in a time domain from a configured sidelink interface DRX cycle start time, a sidelink interface DRX start offset parameter defining an offset in the time domain from the configured sidelink interface DRX cycle start time, and/or a sidelink interface DRX cycle parameter defining a number of repetitions of the configured sidelink interface DRX cycle.

The DRX slot offset circuitry 1144, in combination with the transceiver 1110, may still further be configured to transmit the plurality of sidelink interface DRX candidate configurations to the second network access node via the sidelink interface (e.g., between the Rx UE and the Tx UE) in Layer 1 or Layer 2 signaling using respective pointers that point to respective ones of the plurality of sidelink interface DRX candidate configurations. In some examples, the plurality of sidelink interface DRX candidate configurations may be provided in a list sorted according to an order of preference. In some aspects, the order of preference may be established by the first network access node.

The DRX slot offset circuitry 1144, in combination with the transceiver 1110, may still further be configured to transmit the plurality of sidelink interface DRX candidate configurations to the Rx UE in a radio resource control (RRC) message in Layer 3 signaling, or transmit the plurality of sidelink interface DRX candidate configurations to the Rx UE in a medium access control control-element (MAC CE) in Layer 2 signaling.

The DRX slot offset circuitry 1144 may be configured to execute DRX slot offset instructions (software) 1156 stored in the computer-readable medium 1106 to implement one or more of the functions described herein.

The processor 1104 may further include network access interface and sidelink interface circuitry 1146, configured, for example, to manage transceiver 1110 communications with a sidelink receiver user equipment (Rx UE) on a first network access interface, where the Rx UE may be communicatively coupled to a sidelink transmitter UE (Tx UE) on a sidelink interface and/or manage a sidelink transmitter user equipment (Tx UE) on a second network access interface, where the Tx UE may be communicatively coupled to the sidelink receiver UE (Rx UE) on a sidelink interface. According to some aspects, the Tx UE (or the Rx UE) may be communicatively coupled with a second network access node on a second network access interface. The network access interface and sidelink interface circuitry 1146 may be configured to execute network access interface and sidelink interface instructions (software) 1156 stored in the computer-readable medium 1106 to implement one or more of the functions described herein.

Figure 12:
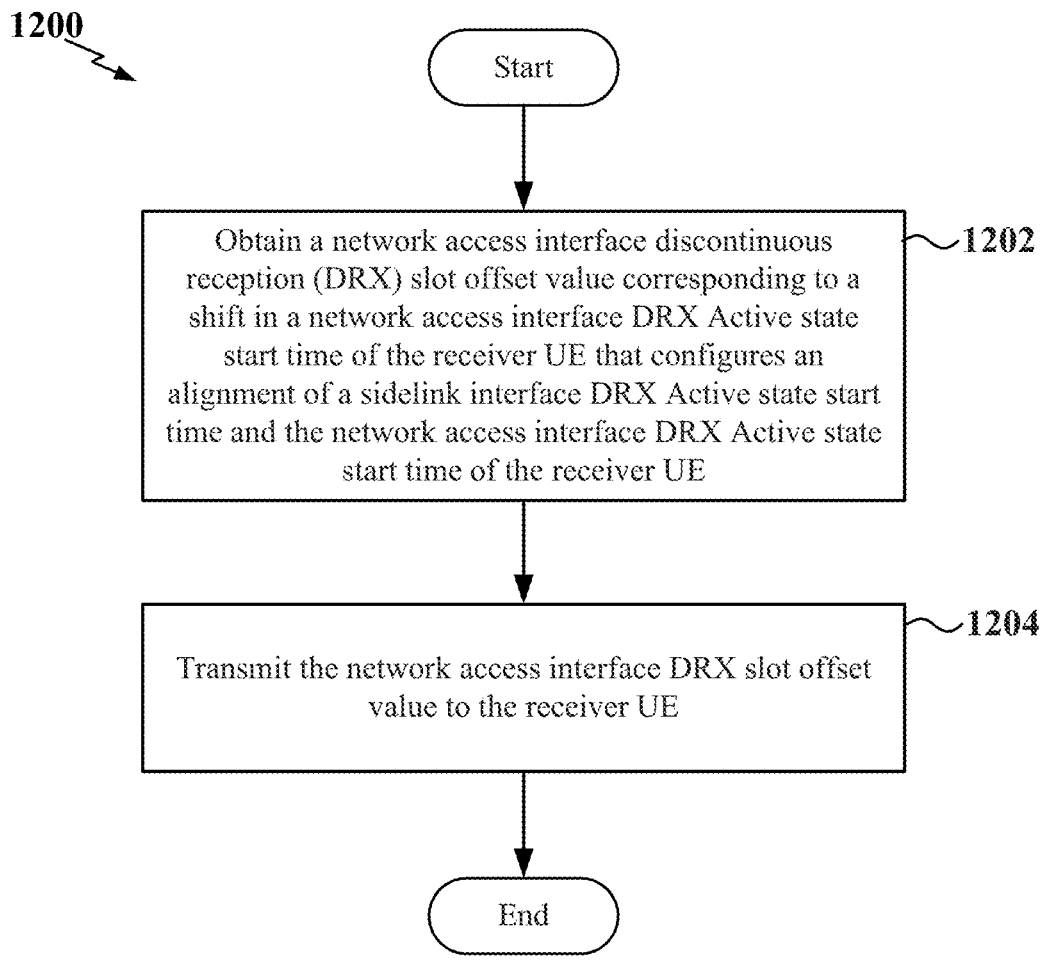
FIG. 12 is a flow chart of an exemplary method of wireless communication at a first network access node in a wireless communication network according to some aspects.

FIG. 12 is a flow chart of an exemplary method of wireless communication 1200 at a first network access node in a wireless communication network according to some aspects. As described below, some or all illustrated features may be omitted in a particular implementation within the scope of the present disclosure, and some illustrated features may not be required for the implementation of all examples. In some examples, the method may be performed by the network access node 1100, as described above and illustrated in FIG. 11, by a processor or processing system, or by any suitable means for carrying out the described functions. The first network access node may include a transceiver communicatively coupled with a sidelink receiver user equipment (Rx UE) on a first network access interface, wherein the Rx UE may be communicatively coupled to a sidelink transmitter UE (Tx UE) on a sidelink interface.

At block 1202, the first network access node may obtain a network access interface discontinuous reception (DRX) slot offset value (e.g., a (e.g., a Uu drx-slot-Offset value) corresponding to a shift in a network access interface DRX Active state start time of the receiver UE that configures an alignment of a sidelink interface DRX Active state start time and the network access interface DRX Active state start time of the receiver UE. For example, the DRX slot offset circuitry 1144, as shown and described above in connection with FIG. 11, may provide a means for obtaining a network access interface DRX slot offset value corresponding to a shift in a network access interface DRX Active state start time of the Rx UE that configures an alignment of a sidelink interface DRX Active state start time and the network access interface DRX Active state start time of the Rx UE.

At block 1204, the first network access node may transmit the network access interface DRX slot offset value to the receiver UE. In one example, the network access interface and sidelink interface circuitry 1146, and/or transceiver 1110, shown and described above in connection with FIG. 11, may provide a means for transmitting the network access interface DRX slot offset value to the receiver UE.

In some examples, the DRX slot offset circuitry and/or the network access interface and sidelink interface circuitry 1146, in combination with the transceiver 1110 may provide a means for transmitting the network access interface DRX slot offset value to the Rx UE in a radio resource control (RRC) message in Layer 3 signaling, or may provide a means for transmitting the network access interface DRX slot offset value to the Rx UE in a medium access control control-element (MAC CE) in Layer 2 signaling, or may provide a means for transmitting a plurality of network access interface DRX candidate configurations to a second network access node via the sidelink interface between the Rx UE and the Tx UE. In some aspects, each of the plurality of network access interface DRX candidate configurations may include at least one value corresponding to at least one of: a network access interface DRX slot offset (e.g., a Uu drx-slot-Offset) parameter defining a slot offset in a time domain from a configured network access interface DRX short cycle start time, a network access interface DRX start offset (e.g., a Uu drx-Start-Offset) parameter defining an offset in the time domain from the configured network access interface DRX short cycle start time, and/or a network access interface DRX short cycle (e.g., Uu drx-ShortCycle) parameter defining a number of repetitions of the configured network access interface DRX short cycle.

Still further, the DRX slot offset circuitry and/or the network access interface and sidelink interface circuitry 1146, in combination with the transceiver 1110 may provide a means for transmitting the plurality of network access interface DRX candidate configurations to the second network access node via the sidelink interface (e.g., between the Rx UE and the Tx UE) in Layer 1 or Layer 2 signaling using respective pointers that point to respective ones of the plurality of network access interface DRX candidate configurations. In some aspects, the plurality of network access interface DRX candidate configurations may be provided in a list sorted according to an order of preference established by the first network access node.

Still further, the DRX slot offset circuitry and/or the network access interface and sidelink interface circuitry 1146, in combination with the transceiver 1110 may provide a means for transmitting the plurality of network access interface DRX candidate configurations to the Rx UE in a radio resource control (RRC) message in Layer 3 signaling, or transmitting the plurality of network access interface DRX candidate configurations to the Rx UE in a medium access control control-element (MAC CE) in Layer 2 signaling.

Figure 13:
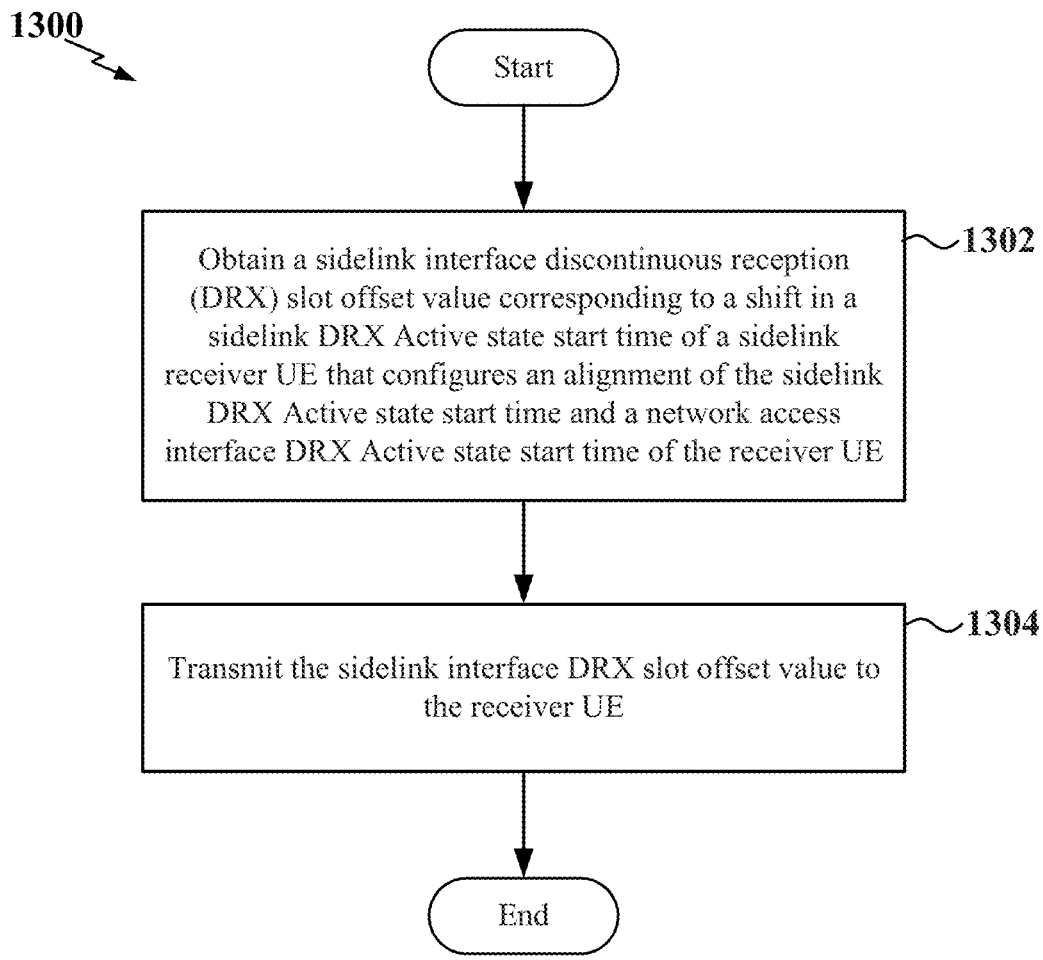
FIG. 13 is a flow chart of an exemplary method of wireless communication at a first network access node in a wireless communication network according to some aspects.

FIG. 13 is a flow chart of an exemplary method of wireless communication 1300 at a first network access node in a wireless communication network according to some aspects. As described below, some or all illustrated features may be omitted in a particular implementation within the scope of the present disclosure, and some illustrated features may not be required for implementation of all examples. In some examples, the method may be performed by the network access node 1100, as described above and illustrated in FIG. 11, by a processor or processing system, or by any suitable means for carrying out the described functions. The first network access node may include a transceiver communicatively coupled with a sidelink transmitter user equipment (Tx UE) on a first network access interface (e.g., a first Uu interface), where the Tx UE may be communicatively coupled to a sidelink receiver UE (Rx UE) on a sidelink interface (e.g., a PC5 interface).

At block 1302, the first network access node may obtain a sidelink interface discontinuous reception (DRX) slot offset value (e.g., a PC5 sl-drx-slot-Offset value) corresponding to a shift in a sidelink interface DRX Active state start time of a sidelink receiver UE that configures an alignment of the sidelink interface DRX Active state start time and a network access interface DRX Active state start time of the receiver UE. For example, the DRX slot offset circuitry 1144, as shown and described above in connection with FIG. 11, may provide a means for obtaining a sidelink interface discontinuous reception (DRX) slot offset value corresponding to a shift in a sidelink interface DRX Active state start time of a sidelink receiver UE that configures an alignment of the sidelink interface DRX Active state start time and a network access interface DRX Active state start time of the receiver UE.

At block 1304, the first network access node may transmit the sidelink interface DRX slot offset value to the receiver UE. For example, the DRX slot offset circuitry 1144, in combination with the transceiver 1110, both as shown and described above in connection with FIG. 11, may provide a means for transmitting the sidelink interface DRX slot offset value to the receiver UE.

In some examples, the DRX slot offset circuitry and/or the network access interface and sidelink interface circuitry 1146, in combination with the transceiver 1110 may provide a means for transmitting the sidelink interface DRX slot offset value to the Rx UE in a radio resource control (RRC) message in Layer 3 signaling, or provide a means for transmitting the sidelink interface DRX slot offset value to the Rx UE in a medium access control control-element (MAC CE) in Layer 2 signaling. In some examples, the DRX slot offset circuitry and/or the network access interface and sidelink interface circuitry 1146, in combination with the transceiver 1110 may provide a means for transmitting a plurality of sidelink interface DRX candidate configurations to the second network access node via the sidelink interface between the Rx UE and the Tx UE.

According to some aspects, each of the plurality of sidelink interface DRX candidate configurations may include at least one value corresponding to at least one of: a sidelink interface discontinuous reception slot offset (e.g., PC5 sl-drx-slot-Offset) parameter defining a slot offset in a time domain from a configured sidelink interface DRX cycle start time, a sidelink interface discontinuous reception start offset (PC5 sl-drx-Start-Offset) parameter defining an offset in the time domain from the configured sidelink interface DRX cycle start time, and/or a sidelink interface DRX cycle (PC5 sl-drx-Cycle) parameter defining a number of repetitions of the configured sidelink interface DRX cycle.

Still further, the DRX slot offset circuitry and/or the network access interface and sidelink interface circuitry 1146, in combination with the transceiver 1110 may provide a means for transmitting the plurality of sidelink interface DRX candidate configurations to the second network access node via the sidelink interface between the Rx UE and the Tx UE in Layer 1 or Layer 2 signaling using respective pointers that point to respective ones of the plurality of sidelink interface DRX candidate configurations. In some examples, the plurality of sidelink interface DRX candidate configurations may be provided in a list sorted according to an order of preference established by the first network access node.

Still further, the DRX slot offset circuitry and/or the network access interface and sidelink interface circuitry 1146, in combination with the transceiver 1110 may provide a means for transmitting the plurality of sidelink interface DRX candidate configurations to the Rx UE in a radio resource control (RRC) message in Layer 3 signaling, or may provide a means for transmitting the plurality of sidelink interface DRX candidate configurations to the Rx UE in a medium access control control-element (MAC CE) in Layer 2 signaling. By way of example and not limitation, the format for the RRC message may be stored in RRC message format 1116 in the memory 1105 and the MAC CE format may be stored in the MAC CE format 1118 of the memory 1105.

Figure 14:
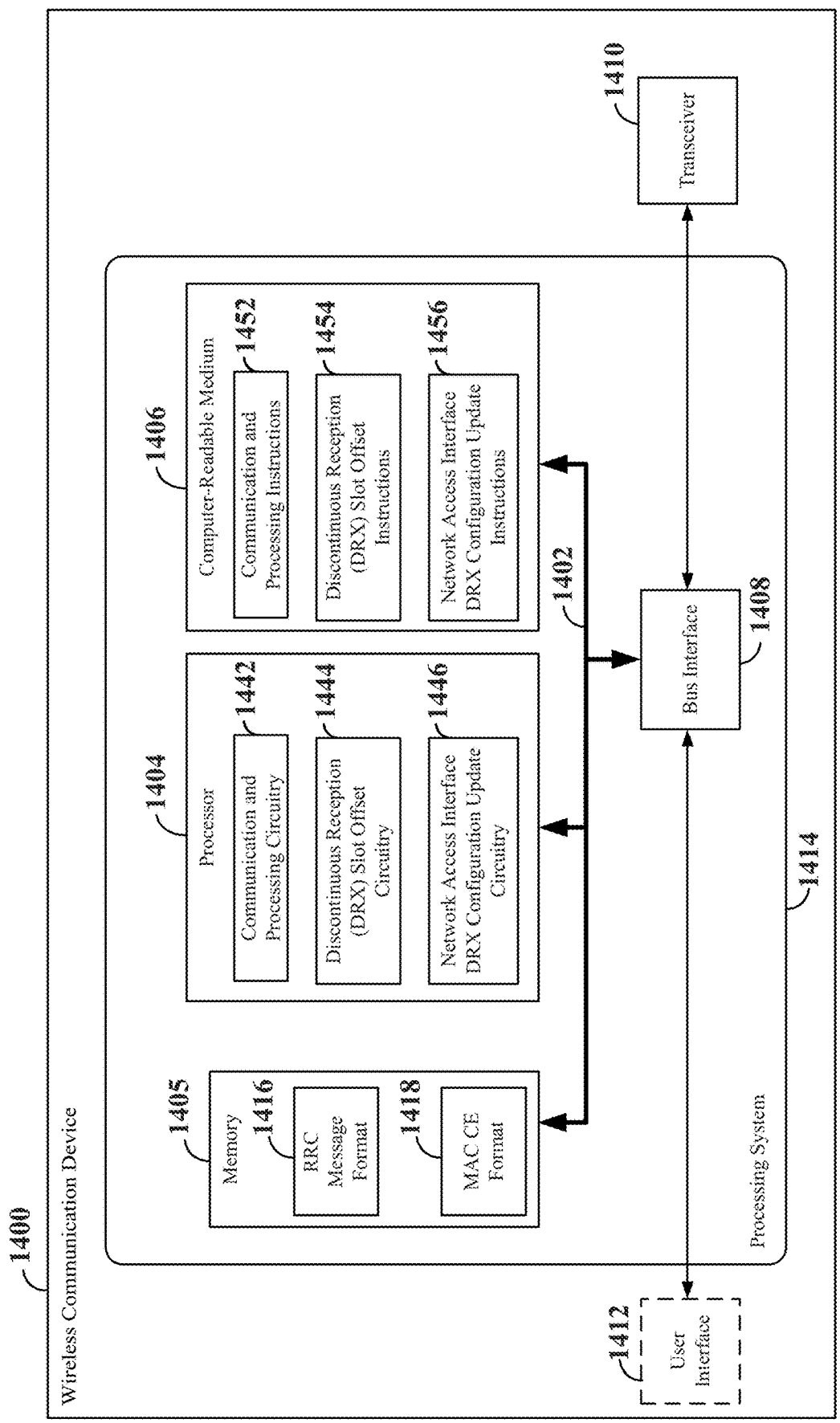
FIG. 14 is a block diagram illustrating an example of a hardware implementation of a wireless communication device employing a processing system according to some aspects.

FIG. 14 is a block diagram illustrating an example of a hardware implementation of a wireless communication device 1400 employing a processing system 1414 according to some aspects. For example, the wireless communication device 1400 may correspond to a sidelink device, such as a V2X device, D2D device, D2N device, or other UE or wireless communication device configured for network and sidelink or D2D communication, as shown and described above in reference to FIGS. 1, 3, and/or 7. The wireless communication device 1400 may operate as a sidelink UE (e.g., a SL Tx UE/a SL Rx UE) via a sidelink interface and may also operate as a network UE via a network access interface.

The wireless communication device 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1400 may be configured to perform any one or more of the functions described herein. That is, the processor 1404, as utilized in the wireless communication device 1400, may be used to implement any one or more of the processes and procedures described below.

The processor 1404 may in some instances be implemented via a baseband or modem chip and in other implementations, the processor 1404 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 links together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further.

A bus interface 1408 provides an interface between the bus 1402 and a transceiver 1410. The transceiver 1410 provides a communication interface or a means for communicating with various other apparatus over a transmission medium (e.g., air interface). Depending upon the nature of the apparatus, a user interface 1412 (e.g., keypad, display, touch screen, speaker, microphone, control knobs, etc.) may also be provided. Of course, such a user interface 1412 is optional, and may be omitted in some examples.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software. For example, the memory 1405 may store one or more SCI-2 format(s) 1416 and one or more MAC CE format(s) 1418 used by the processor 1404 in connection with the generation of SL-PRS resource reservation messages in sidelink positioning.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. In some examples, the computer-readable medium 1406 may be part of the memory 1405. Those skilled in the art will recognize how best to implement the described functionality presented throughout this disclosure depending on the particular application and the overall design constraints imposed on the overall system.

In some aspects of the disclosure, the processor 1404 may include circuitry configured for various functions. For example, the processor 1404 may include communication and processing circuitry 1442, configured to communicate with one or more sidelink devices (e.g., other UEs) via respective sidelink interfaces (e.g., PC5 interfaces). In addition, the communication and processing circuitry 1442 may be configured to communicate with a base station (e.g., gNB or eNB) via a network access interface. In some examples, the communication and processing circuitry 1442 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1442 may include one or more transmit/receive chains.

In some implementations where the communication involves receiving information, the communication and processing circuitry 1442 may obtain information from a component of the wireless communication device 1400 (e.g., from the transceiver 1410 that receives the information via radio frequency signaling or some other type of signaling suitable for the applicable communication medium), process (e.g., decode) the information, and output the processed information. For example, the communication and processing circuitry 1442 may output the information to another component of the processor 1404, to the memory 1405, or to the bus interface 1408. In some examples, the communication and processing circuitry 1442 may receive one or more of signals, messages, other information, or any combination thereof. In some examples, the communication and processing circuitry 1442 may receive information via one or more channels. In some examples, the communication and processing circuitry 1442 may include functionality for a means for receiving. In some examples, the communication and processing circuitry 1442 may include functionality for a means for processing, including a means for demodulating, a means for decoding, etc.

In some implementations where the communication involves sending (e.g., transmitting) information, the communication and processing circuitry 1442 may obtain information (e.g., from another component of the processor 1404, the memory 1405, or the bus interface 1408), process (e.g., modulate, encode, etc.) the information, and output the processed information. For example, the communication and processing circuitry 1442 may output the information to the transceiver 1410 (e.g., that transmits the information via radio frequency signaling or some other type of signaling suitable for the applicable communication medium). In some examples, the communication and processing circuitry 1442 may send one or more signals, messages, other information, or any combination thereof. In some examples, the communication and processing circuitry 1442 may send information via one or more channels. In some examples, the communication and processing circuitry 1442 may include functionality for a means for sending (e.g., a means for transmitting). In some examples, the communication and processing circuitry 1442 may include functionality for a means for generating, including a means for modulating, a means for encoding, etc.

In some examples the wireless communication device 1400 may be configured as a sidelink receiver user equipment (Rx UE) and may be referred to herein as an Rx UE. As shown the Rx UE may include a transceiver 1410 communicatively coupled with a first network access node on a first network access interface (e.g., a first Uu interface) and a sidelink transmitter UE (Tx UE) on a sidelink interface (PC5 interface).

The processor 1404 may further include DRX slot offset circuitry 1444, which, in cooperation with the transceiver 1410, may be configured, for example, to receive a network access interface discontinuous reception slot offset (e.g., a Uu drx-slot-Offset) value. The DRX slot offset circuitry 1444, in cooperation with the transceiver 1410, may further be configured, for example, to receive the network access interface discontinuous reception slot offset value in a radio resource control (RRC) message in Layer 3 signaling, or to receive the network access interface discontinuous reception slot offset value in a medium access control control-element (MAC CE) in Layer 2 signaling.

The DRX slot offset circuitry 1444, in cooperation with the transceiver 1410, may further be configured, for example, to receive a plurality of network access interface DRX candidate configurations from the first network access node on the first network access interface. In some examples, each of the plurality of network access interface DRX candidate configurations may include at least one value corresponding to at least one of: a network access interface DRX slot offset (e.g., a Uu drx-slot-Offset) parameter defining a slot offset in a time domain from a configured network access interface DRX short cycle start time, a network access interface DRX start offset (e.g., a Uu drx-Start-Offset) parameter defining an offset in the time domain from the configured network access interface DRX short cycle start time, and/or a network access interface DRX short cycle (e.g., a Uu drx-ShortCycle) parameter defining a number of repetitions of the configured network access interface DRX short cycle.

The DRX slot offset circuitry 1444, in cooperation with the transceiver 1410, may still further be configured, for example, to receive the plurality of network access interface DRX candidate configurations via the sidelink interface between the Rx UE and the Tx UE in Layer 1 or Layer 2 signaling, or to receive the plurality of network access interface DRX candidate configurations in a radio resource control (RRC) message in Layer 3 signaling, or to receive the plurality of network access interface DRX candidate configurations in a medium access control control-element (MAC CE) in Layer 2 signaling. In some examples the DRX slot offset circuitry 1444, in cooperation with the transceiver 1410, may still further be configured, for example, to receive a plurality of network access interface DRX candidate configurations as respective pointers that point to respective ones of the plurality of network access interface DRX candidate configurations. In some examples, the plurality of network access interface DRX candidate configurations may be provided in a list sorted according to an order of preference established by the first network access node.

The DRX slot offset circuitry 1444 may be configured to execute DRX slot offset instructions (software) 1456 stored in the computer-readable medium 1406 to implement one or more of the functions described herein The processor 1404 may further include network access interface DRX configuration update circuitry 1446, which, in cooperation with the transceiver 1410, may be configured, for example, to update a network access interface discontinuous reception (DRX) configuration of the Rx UE with the network access interface DRX slot offset value, and shift a network access interface DRX Active state start time, to align a sidelink interface DRX Active state start time and the network access interface DRX Active state start time based on the update of the UE DRX configuration.

Still further, the network access interface DRX configuration update circuitry 1446, and/or communication and processing circuitry 1442, may be configured, for example, to receive an update to at least one of a network access interface DRX configuration or a sidelink interface DRX configuration, and to change the at least one of the network access interface DRX configuration or the sidelink interface DRX configuration according to the update, where the update may include at least one change to a parameter associated with at least one of a PC5 discontinuous reception (DRX) cycle, a network access interface DRX short cycle, or a network access interface DRX long cycle; the sidelink interface DRX cycle may correspond to a first integer number of network access interface DRX short cycles, the network access interface DRX long cycle may correspond to a second integer number of network access interface DRX short cycles, and the first integer number divided by the second integer number leaves no remainder.

The network access interface DRX configuration update circuitry 1446 may be configured to execute Rx UE DRX configuration update instructions (software) 1456 stored in the computer-readable medium 1406 to implement one or more of the functions described herein.

By way of example and not limitation, a format for the RRC message may be stored in RRC message format 1416 in the memory 1405 and the MAC CE format may be stored in the MAC CE format 1418 of the memory 1405.

Figure 15:
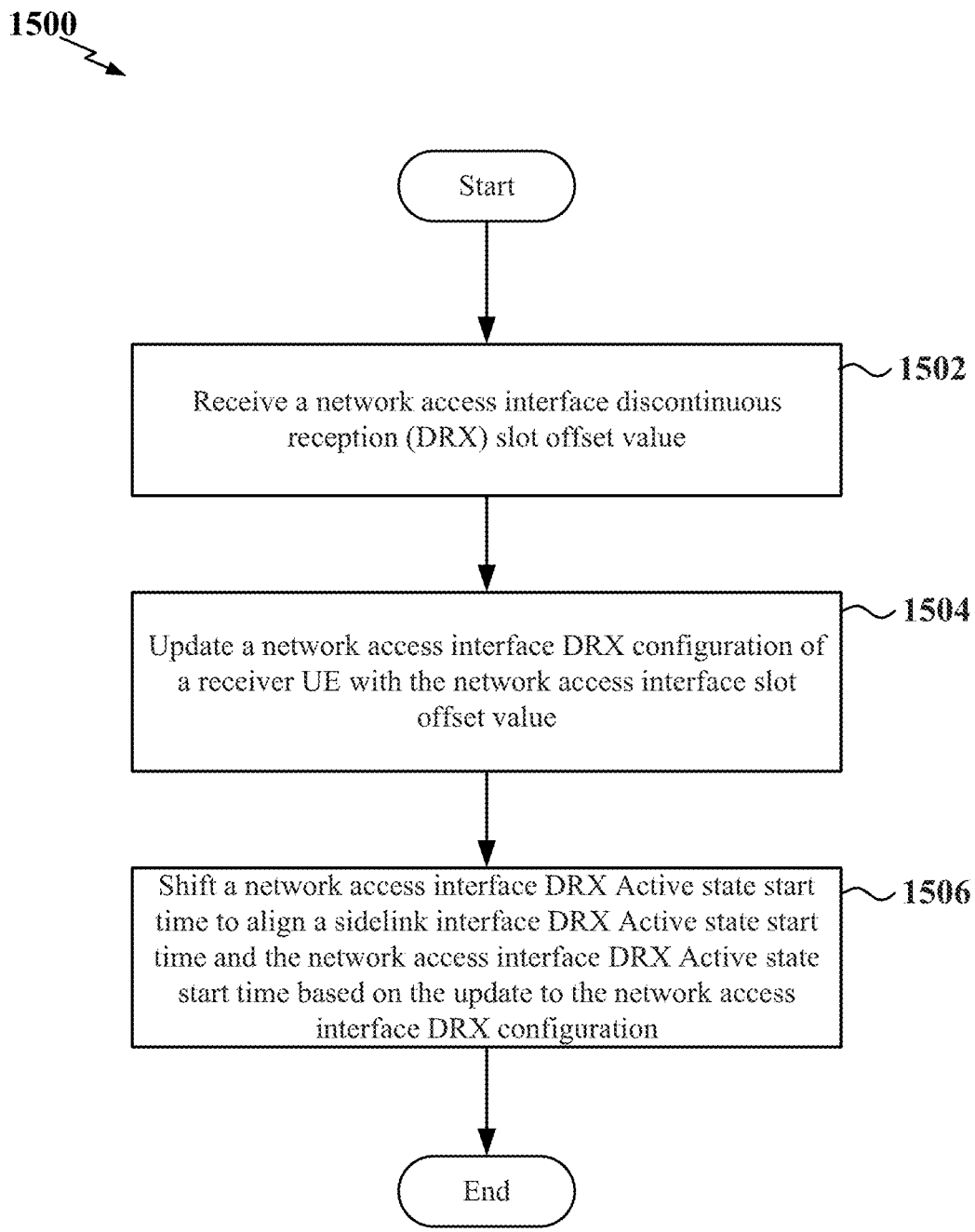
FIG. 15 is a flow chart of an exemplary method of wireless communication at a sidelink receiver UE in a wireless communication network according to some aspects.

FIG. 15 is a flow chart of an exemplary method of wireless communication 1500 at a sidelink receiver UE (Rx UE) in a wireless communication network according to some aspects. As described below, some or all illustrated features may be omitted in a particular implementation within the scope of the present disclosure, and some illustrated features may not be required for implementation of all examples. In some examples, the method may be performed by the wireless communication device 1400, as described above and illustrated in FIG. 14, by a processor or processing system, or by any suitable means for carrying out the described functions. The wireless communication device may include a transceiver communicatively coupled with a first network access node on a first network access interface and a sidelink transmitter UE (Tx UE) on a sidelink interface.

At block 1502, the wireless communication device (e.g., a first wireless communication device configured for sidelink communication having a transceiver configured to communicatively couple with a first network access node on a first network access interface (e.g., a first Uu interface) and a sidelink transmitter UE on a sidelink interface (e.g., a PC5 interface)) may receive a network access interface discontinuous reception (DRX) slot offset value (e.g., a Uu drx-slot-Offset value). For example, the DRX slot offset circuitry 1444, in cooperation with the transceiver 1410, both shown and described above in connection with FIG. 14, may provide a means for receiving a network access interface DRX slot offset value, as well as means for receiving the network access interface DRX slot offset value in a radio resource control (RRC) message in Layer 3 signaling, or receiving the network access interface DRX slot offset value in a medium access control control-element (MAC CE) in Layer 2 signaling.

Still further, the DRX slot offset circuitry 1444, in cooperation with the transceiver 1410, may provide a means for receiving a plurality of network access interface DRX candidate configurations from the first network access node on the first network access interface. In some examples, each of the plurality of network access interface DRX candidate configurations may include at least one value corresponding to at least one of: a network access interface DRX slot offset (e.g., a Uu drx-slot-Offset) parameter defining a slot offset in a time domain from a configured network access interface DRX short cycle start time, a network access interface DRX start offset (e.g., a Uu drx-Start-Offset) parameter defining an offset in the time domain from the configured network access interface DRX short cycle start time, and/or a network access interface DRX short cycle (e.g., a Uu drx-ShortCycle) parameter defining a number of repetitions of the configured network access interface DRX short cycle.

The DRX slot offset circuitry 1444, in cooperation with the transceiver 1410, both shown and described above in connection with FIG. 14, may still further provide a means for receiving the plurality of network access interface DRX candidate configurations via the sidelink interface between the Rx UE and the Tx UE in Layer 1 or Layer 2 signaling, or the means for receiving the plurality of network access interface DRX candidate configurations as respective pointers that point to respective ones of the plurality of network access interface DRX candidate configurations, or the means for receiving the plurality of network access interface DRX candidate configurations in a radio resource control (RRC) message in Layer 3 signaling, or the means for receiving the plurality of network access interface DRX candidate configurations in a medium access control control-element (MAC CE) in Layer 2 signaling. In some examples, the plurality of network access interface DRX candidate configurations may be provided in a list sorted according to an order of preference established by the first network access node.

At block 1504, the wireless communication device may update a network access interface DRX configuration of the receiver UE with the network access interface DRX slot offset value. For example, the network access interface DRX configuration update circuitry 1446, shown and described above in connection with FIG. 14, may provide a means for updating a network access interface DRX configuration of the receiver UE with the network access interface DRX slot offset value.

At block 1506, the wireless communication device may shift a network access interface DRX Active state start time to align a sidelink interface DRX Active state start time and the network access interface DRX Active state start time based on the update to the network access interface DRX configuration. For example, the communication and processing circuitry 1442, shown and described above in connection with FIG. 14, may provide a means for shifting a network access interface DRX Active state start time to align a sidelink interface DRX Active state start time and the network access interface DRX Active state start time based on the update to the network access interface DRX configuration. The communication and processing circuitry 1442, in combination with the network access interface DRX configuration update circuitry 1446, and/or the transceiver 1410, all as shown and described above in connection with FIG. 14, may still further provide a means for receiving an update to at least one of a network access interface DRX configuration or a sidelink interface DRX configuration and a means for changing the at least one of the network access interface DRX configuration or the sidelink interface DRX configuration according to the update. In some examples, the update may include at least one change to a parameter associated with at least one of the sidelink interface DRX cycle, a network access interface DRX short cycle, or a network access interface DRX long cycle, the sidelink interface DRX cycle may correspond to a first integer number of network access interface DRX short cycles, the network access interface DRX long cycle may correspond to a second integer number of network access interface DRX short cycles, and the first integer number divided by the second integer number leaves no remainder.

Of course, in the above examples, the circuitry included in the processors 1104 and 1404 are merely provided as examples, and other means for carrying out the described functions may be included within various aspects of the present disclosure, including but not limited to the instructions stored in the computer-readable medium 1106 and 1406, or any other suitable apparatus or means described in any one of the FIGS. 1, 3, 5, 7, 11, and/or 14, and utilizing, for example, the processes and/or algorithms described herein in relation to FIGS. 7, 12, 13, and/or 15.

The processes shown in FIGS. 7, 12, 13, and/or 15 may include additional aspects, such as any single aspect or any combination of aspects described below and/or in connection with one or more other processes described elsewhere herein.

Aspect 1: A first network access node in a wireless communication network, comprising: a transceiver communicatively coupled with a sidelink receiver user equipment (UE) on a first network access interface, wherein the receiver UE includes a sidelink interface, a memory, and a processor communicatively coupled to the transceiver and the memory, wherein the processor and the memory are configured to: obtain a network access interface discontinuous reception (DRX) slot offset value corresponding to a shift in a network access interface DRX Active state start time of the receiver UE that configures an alignment of a sidelink interface DRX Active state start time and the network access interface DRX Active state start time of the receiver UE, and transmit the network access interface DRX slot offset value to the receiver UE.

Aspect 2: The first network access node of aspect 1, wherein the first network access interface is a Uu interface and the sidelink interface is a PC5 interface.

Aspect 3: The first network access node of aspect 1 or 2, wherein the processor and the memory are further configured to: transmit the network access interface DRX slot offset value to the receiver UE in a radio resource control (RRC) message in Layer 3 signaling.

Aspect 4: The first network access node of aspect 1 or 2, wherein the processor and the memory are further configured to: transmit the network access interface DRX slot offset value to the receiver UE in a medium access control control-element (MAC CE) in Layer 2 signaling.

Aspect 5: The first network access node of any of aspects 1 through 4, wherein the processor and the memory are further configured to: transmit a plurality of network access interface DRX candidate configurations to a second network access node via the sidelink interface.

Aspect 6: The first network access node of aspect 5, wherein each of the plurality of network access interface DRX candidate configurations includes at least one value corresponding to at least one of: a network access interface DRX slot offset parameter defining a slot offset in a time domain from a configured network access interface DRX short cycle start time, a network access interface DRX start offset parameter defining an offset in the time domain from the configured network access interface DRX short cycle start time, and/or a network access interface DRX short cycle parameter defining a number of repetitions of the configured network access interface DRX short cycle.

Aspect 7: The first network access node of any of aspects 1 through 6, wherein the processor and the memory are further configured to: transmit the plurality of network access interface DRX candidate configurations to the second network access node via the sidelink interface in Layer 1 or Layer 2 signaling using respective pointers that point to respective ones of the plurality of network access interface DRX candidate configurations.

Aspect 8: The first network access node of aspects 1 through 7, wherein the plurality of network access interface DRX candidate configurations is provided in a list sorted according to an order of preference established by the first network access node.

Aspect 9: The first network access node of aspects 1 through 8, wherein the processor and the memory are further configured to: transmit the plurality of network access interface DRX candidate configurations to the receiver UE in a radio resource control (RRC) message in Layer 3 signaling.

Aspect 10: The first network access node of aspects 1 through 8, wherein the processor and the memory are further configured to: transmit the plurality of network access interface DRX candidate configurations to the receiver UE in a medium access control control-element (MAC CE) in Layer 2 signaling.

Aspect 11: A first network access node in a wireless communication network, comprising: a transceiver communicatively coupled with a sidelink transmitter user equipment (UE) on a first network access interface, wherein the transmitter UE includes a sidelink interface, a memory, and a processor communicatively coupled to the transceiver and the memory, wherein the processor and the memory are configured to: obtain a sidelink interface discontinuous reception (DRX) slot offset value corresponding to a shift in a sidelink interface DRX Active state start time of a sidelink receiver UE that configures an alignment of the sidelink interface DRX Active state start time and a network access interface DRX Active state start time of the receiver UE, and transmit the sidelink interface DRX slot offset value to the receiver UE.

Aspect 12: The first network access node of aspect 11, wherein the first network access interface is a Uu interface and the sidelink interface is a PC5 interface.

Aspect 13: The first network access node of aspect 11 or 12, wherein the processor and the memory are further configured to: transmit the sidelink interface DRX slot offset value to the receiver UE in a radio resource control (RRC) message in Layer 3 signaling.

Aspect 14: The first network access node of any of aspects 11 or 12, wherein the processor and the memory are further configured to: transmit the sidelink interface DRX slot offset value to the receiver UE in a medium access control control-element (MAC CE) in Layer 2 signaling.

Aspect 15: The first network access node of any of aspects 11 through 14, wherein the processor and the memory are further configured to: transmit a plurality of sidelink interface DRX candidate configurations to a second network access node via the sidelink interface.

Aspect 16: The first network access node of aspect 15, wherein each of the plurality of sidelink interface DRX candidate configurations includes at least one value corresponding to at least one of: a sidelink interface DRX slot offset parameter defining a slot offset in a time domain from a configured sidelink interface DRX cycle start time, a sidelink interface DRX start offset parameter defining an offset in the time domain from the configured sidelink interface DRX cycle start time, and/or a sidelink interface DRX cycle parameter defining a number of repetitions of the configured sidelink interface DRX cycle.

Aspect 17: The first network access node of any of aspects 11 through 16, wherein the processor and the memory are further configured to: transmit the plurality of sidelink interface DRX candidate configurations to the second network access node via the sidelink interface in Layer 1 or Layer 2 signaling using respective pointers that point to respective ones of the plurality of sidelink interface DRX candidate configurations.

Aspect 18: The first network access node of any of aspects 11 through 17, wherein the plurality of sidelink interface DRX candidate configurations is provided in a list sorted according to an order of preference established by the first network access node.

Aspect 19: The first network access node of any of aspects 11 through 18, wherein the processor and the memory are further configured to: transmit the plurality of sidelink interface DRX candidate configurations to the receiver UE in a radio resource control (RRC) message in Layer 3 signaling.

Aspect 20: The first network access node of any of aspects 11 through 19, wherein the processor and the memory are further configured to: transmit the plurality of sidelink interface DRX candidate configurations to the receiver UE in a medium access control control-element (MAC CE) in Layer 2 signaling.

Aspect 21: A sidelink receiver user equipment (UE) in a wireless communication network, comprising: a transceiver configured to communicatively couple with a first network access node on a first network access interface and a sidelink transmitter UE on a sidelink interface, a memory, and a processor communicatively coupled to the transceiver and the memory, wherein the processor and the memory are configured to: receive a network access interface discontinuous reception (DRX) slot offset value, update a network access interface DRX configuration of the receiver UE with the network access interface DRX slot offset value, and shift a network access interface DRX Active state start time to align a sidelink interface DRX Active state start time and the network access interface DRX Active state start time based on the update to the network access interface DRX configuration.

Aspect 22: The receiver UE of aspect 21, wherein the first network access interface is a Uu interface and the sidelink interface is a PC5 interface.

Aspect 23: The receiver UE of aspect 21 or 22, wherein the processor and the memory are further configured to: receive the network access interface DRX slot offset value in a radio resource control (RRC) message in Layer 3 signaling, or receive the network access interface DRX slot offset value in a medium access control control-element (MAC CE) in Layer 2 signaling.

Aspect 24: The receiver UE of any of aspects 21 through 23, wherein the processor and the memory are further configured to: receive an update to at least one of a network access interface DRX configuration or a sidelink interface DRX configuration; and change the at least one of the network access interface DRX configuration or the sidelink interface DRX configuration according to the update, wherein: the update includes at least one change to a parameter associated with at least one of the sidelink interface DRX cycle, a network access interface DRX short cycle, or a network access interface DRX long cycle, the sidelink interface DRX cycle corresponds to a first integer number of network access interface DRX short cycles, the network access interface DRX long cycle corresponds to a second integer number of network access interface DRX short cycles, and the first integer number divided by the second integer number leaves no remainder.

Aspect 25: The receiver UE of any of aspects 21 through 24, wherein the processor and the memory are further configured to: receive a plurality of network access interface DRX candidate configurations from the first network access node on the first network access interface.

Aspect 26: The receiver UE of any of aspects 21 through 25, wherein each of the plurality of network access interface DRX candidate configurations includes at least one value corresponding to at least one of: a network access interface DRX slot offset parameter defining a slot offset in a time domain from a configured network access interface DRX short cycle start time, a network access interface DRX start offset parameter defining an offset in the time domain from the configured network access interface DRX short cycle start time, and/or a network access interface DRX short cycle parameter defining a number of repetitions of the configured network access interface DRX short cycle.

Aspect 27: The receiver UE of any of aspects 21 through 26, wherein the processor and the memory are further configured to: receive the plurality of network access interface DRX candidate configurations as respective pointers that point to respective ones of the plurality of network access interface DRX candidate configurations.

Aspect 28: The receiver UE of any of aspects 21 through 27, wherein the plurality of network access interface DRX candidate configurations is provided in a list sorted according to an order of preference established by the first network access node.

Aspect 29: The receiver UE of any of aspects 21 through 28, wherein the processor and the memory are further configured to: receive the plurality of network access interface DRX candidate configurations in a radio resource control (RRC) message in Layer 3 signaling.

Aspect 30: The receiver UE of any of aspects 21 through 29, wherein the processor and the memory are further configured to: receive the plurality of network access interface DRX candidate configurations in a medium access control control-element (MAC CE) in Layer 2 signaling.

Aspect 31: A method of wireless communication in a wireless communication network, comprising any method of any one of aspects 1 through 30.

Aspect 32: An apparatus configured for wireless communication in a wireless communication network, comprising at least one means for performing a method of any one of aspects 1 through 30.

Aspect 33: A non-transitory computer-readable medium storing computer-executable code, comprising code for causing an apparatus to perform any method of any one of aspects 1 through 30.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 5, 7, 11, and/or 14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. Additionally, a phrase referring to "A and/or B" is intended to cover A, B, and A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first network access node in a wireless communication network, comprising:
a transceiver communicatively coupled with a sidelink receiver user equipment (UE) on a first network access interface, wherein the sidelink receiver UE includes a sidelink interface;
a memory; and
a processor communicatively coupled to the transceiver and the memory, wherein the processor and the memory are configured to:
obtain a network access interface discontinuous reception (DRX) slot offset value corresponding to a shift in a network access interface DRX Active state start time of the sidelink receiver UE that configures an alignment of a sidelink interface DRX Active state start time and the network access interface DRX Active state start time of the sidelink receiver UE,
transmit the network access interface DRX slot offset value to the sidelink receiver UE, and
transmit a plurality of network access interface DRX candidate configurations to a second network access node via the sidelink interface in Layer 1 or Layer 2 signaling using respective pointers that point to respective ones of the plurality of network access interface DRX candidate configurations.

2. The first network access node of claim 1, wherein the first network access interface is a Uu interface and the sidelink interface is a PC5 interface.

3. The first network access node of claim 1, wherein the processor and the memory are further configured to:
transmit the network access interface DRX slot offset value to the sidelink receiver UE in a radio resource control (RRC) message in Layer 3 signaling.

4. The first network access node of claim 1, wherein the processor and the memory are further configured to:
transmit the network access interface DRX slot offset value to the sidelink receiver UE in a medium access control control-element (MAC CE) in Layer 2 signaling.

5. The first network access node of claim 1, wherein each of the plurality of network access interface DRX candidate configurations includes at least one value corresponding to at least one of:
a network access interface DRX slot offset parameter defining a slot offset in a time domain from a configured network access interface DRX short cycle start time,
a network access interface DRX start offset parameter defining an offset in the time domain from the configured network access interface DRX short cycle start time, or
a network access interface DRX short cycle parameter defining a number of repetitions of the configured network access interface DRX short cycle.

6. The first network access node of claim 1, wherein the plurality of network access interface DRX candidate configurations is provided in a list sorted according to an order of preference established by the first network access node.

7. The first network access node of claim 1, wherein the processor and the memory are further configured to:
transmit the plurality of network access interface DRX candidate configurations to the sidelink receiver UE in a radio resource control (RRC) message in Layer 3 signaling.

8. The first network access node of claim 1, wherein the processor and the memory are further configured to:
transmit the plurality of network access interface DRX candidate configurations to the sidelink receiver UE in a medium access control control-element (MAC CE) in Layer 2 signaling.

9. A first network access node in a wireless communication network, comprising:
a transceiver communicatively coupled with a sidelink transmitter user equipment (UE) on a first network access interface, wherein the sidelink transmitter UE includes a sidelink interface;
a memory; and
a processor communicatively coupled to the transceiver and the memory, wherein the processor and the memory are configured to:

obtain a sidelink interface discontinuous reception (DRX) slot offset value corresponding to a shift in a sidelink interface DRX Active state start time of a sidelink receiver UE that configures an alignment of the sidelink interface DRX Active state start time and a network access interface DRX Active state start time of the sidelink receiver UE, transmit the sidelink interface DRX slot offset value to the sidelink receiver UE, and transmit a plurality of sidelink interface DRX candidate configurations to a second network access node via the sidelink interface in Layer 1 or Layer 2 signaling using respective pointers that point to respective ones of the plurality of sidelink interface DRX candidate configurations.

10. The first network access node of claim 9, wherein the first network access interface is a Uu interface and the sidelink interface is a PC5 interface.

11. The first network access node of claim 9, wherein the processor and the memory are further configured to:
transmit the sidelink interface DRX slot offset value to the sidelink receiver UE in a radio resource control (RRC) message in Layer 3 signaling.

12. The first network access node of claim 9, wherein the processor and the memory are further configured to:
transmit the sidelink interface DRX slot offset value to the sidelink receiver UE in a medium access control control-element (MAC CE) in Layer 2 signaling.

13. The first network access node of claim 9, wherein each of the plurality of sidelink interface DRX candidate configurations includes at least one value corresponding to at least one of:
a sidelink interface DRX slot offset parameter defining a slot offset in a time domain from a configured sidelink interface DRX cycle start time,
a sidelink interface DRX start offset parameter defining an offset in the time domain from the configured sidelink interface DRX cycle start time, or
a sidelink interface DRX cycle parameter defining a number of repetitions of the configured sidelink interface DRX cycle.

14. The first network access node of claim 9, wherein the plurality of sidelink interface DRX candidate configurations is provided in a list sorted according to an order of preference established by the first network access node.

15. The first network access node of claim 9, wherein the processor and the memory are further configured to:
transmit the plurality of sidelink interface DRX candidate configurations to the sidelink receiver UE in a radio resource control (RRC) message in Layer 3 signaling.

16. The first network access node of claim 9, wherein the processor and the memory are further configured to:
transmit the plurality of sidelink interface DRX candidate configurations to the sidelink receiver UE in a medium access control control-element (MAC CE) in Layer 2 signaling.

17. A sidelink receiver user equipment (UE) in a wireless communication network, comprising:
a transceiver configured to communicatively couple with a first network access node on a first network access interface and a sidelink transmitter UE on a sidelink interface;
a memory; and
a processor communicatively coupled to the transceiver and the memory, wherein the processor and the memory are configured to:

receive a network access interface discontinuous reception (DRX) slot offset value, shift a network access interface DRX Active state start time by the network access interface DRX slot offset value to align a sidelink interface DRX Active state start time and the network access interface DRX Active state start time, receive an update to at least one of a network access interface DRX configuration or a sidelink interface DRX configuration, and change the at least one of the network access interface DRX configuration or the sidelink interface DRX configuration according to the update, wherein:
the update includes at least one change to a parameter associated with at least one of a sidelink interface DRX cycle, a network access interface DRX short cycle, or a network access interface DRX long cycle,
the sidelink interface DRX cycle corresponds to a first integer number of network access interface DRX short cycles,
the network access interface DRX long cycle corresponds to a second integer number of network access interface DRX short cycles, and
the first integer number divided by the second integer number leaves no remainder.

18. The sidelink receiver UE of claim 17, wherein the first network access interface is a Uu interface and the sidelink interface is a PC5 interface.

19. The sidelink receiver UE of claim 17, wherein the processor and the memory are further configured to:
receive the network access interface DRX slot offset value in a radio resource control (RRC) message in Layer 3 signaling, or
receive the network access interface DRX slot offset value in a medium access control control-element (MAC CE) in Layer 2 signaling.

20. The sidelink receiver UE of claim 17, wherein the processor and the memory are further configured to:
receive a plurality of network access interface DRX candidate configurations from the first network access node on the first network access interface.

21. The sidelink receiver UE of claim 20, wherein each of the plurality of network access interface DRX candidate configurations includes at least one value corresponding to at least one of:
a network access interface DRX slot offset parameter defining a slot offset in a time domain from a configured network access interface DRX short cycle start time,
a network access interface DRX start offset parameter defining an offset in the time domain from the configured network access interface DRX short cycle start time, or
a network access interface DRX short cycle parameter defining a number of repetitions of the configured network access interface DRX short cycle.

22. The sidelink receiver UE of claim 20, wherein the processor and the memory are further configured to:
receive the plurality of network access interface DRX candidate configurations as respective pointers that point to respective ones of the plurality of network access interface DRX candidate configurations.

23. The sidelink receiver UE of claim 20, wherein the plurality of network access interface DRX candidate configurations is provided in a list sorted according to an order of preference established by the first network access node.

24. The sidelink receiver UE of claim 20, wherein the processor and the memory are further configured to:
    receive the plurality of network access interface DRX candidate configurations in a radio resource control (RRC) message in Layer 3 signaling.

25. The sidelink receiver UE of claim 20, wherein the processor and the memory are further configured to:
    receive the plurality of network access interface DRX candidate configurations in a medium access control control-element (MAC CE) in Layer 2 signaling.

\* \* \* \* \*